US008599266B2

(12) United States Patent
Trivedi et al.

(10) Patent No.: US 8,599,266 B2
(45) Date of Patent: Dec. 3, 2013

(54) DIGITAL PROCESSING OF VIDEO IMAGES

(75) Inventors: Mohan M. Trivedi, San Diego, CA (US); Kohsia S. Huang, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 1541 days.

(21) Appl. No.: 10/519,818

(22) PCT Filed: Jul. 1, 2003

(86) PCT No.: PCT/US03/20922
§ 371 (c)(1),
(2), (4) Date: Feb. 15, 2006

(87) PCT Pub. No.: WO2004/004320
PCT Pub. Date: Jan. 8, 2004

(65) Prior Publication Data
US 2006/0187305 A1    Aug. 24, 2006

Related U.S. Application Data

(60) Provisional application No. 60/393,480, filed on Jul. 1, 2002.

(51) Int. Cl.
*H04N 7/18*    (2006.01)
(52) U.S. Cl.
USPC ............ 348/169; 348/143; 382/103; 382/118
(58) Field of Classification Search
USPC .................................................. 348/143, 169
See application file for complete search history.

(56) References Cited

U.S. PATENT DOCUMENTS

| | | | |
|---|---|---|---|
| 5,145,112 A | 9/1992 | Ueda | |
| 5,185,667 A | 2/1993 | Zimmerman | |
| 5,846,139 A | 12/1998 | Bair et al. | |
| 5,870,138 A * | 2/1999 | Smith et al. | 348/143 |
| 5,903,782 A | 5/1999 | Oxaal | |
| 6,038,367 A | 3/2000 | Abecassis | |
| 6,173,068 B1 * | 1/2001 | Prokoski | 382/115 |
| 6,292,776 B1 | 9/2001 | Chengalvarayan | |
| 6,337,708 B1 | 1/2002 | Furlan et al. | |
| 6,346,967 B1 | 2/2002 | Gullichsen et al. | |
| 6,361,507 B1 | 3/2002 | Foxlin | |
| 6,369,818 B1 | 4/2002 | Hoffman et al. | |
| 6,404,900 B1 * | 6/2002 | Qian et al. | 382/103 |
| 6,437,819 B1 * | 8/2002 | Loveland | 348/143 |
| 6,720,987 B2 * | 4/2004 | Koyanagi et al. | 348/36 |
| 6,917,692 B1 * | 7/2005 | Murching et al. | 382/103 |
| 6,970,183 B1 * | 11/2005 | Monroe | 348/143 |

(Continued)

OTHER PUBLICATIONS

Belhumeur, J.P. Hespanha, and D.J. Kriegman, "Eigenfaces vs. Fisherfaces: Recognition Using Class Specific Linear Projection," IEEE Transactions on Pattern Analysis and Machine Intelligence. vol. 19, No. 7, pp. 711-720, Jul. 1997.

(Continued)

*Primary Examiner* — Christopher S Kelley
*Assistant Examiner* — Christopher Findley
(74) *Attorney, Agent, or Firm* — Perkins Coie LLP

(57) ABSTRACT

Digital video imaging systems and techniques for efficiently transforming warped video images into rectilinear video images, real-time tracking of persons and objects, face recognition of persons, monitoring and tracking head pose of a person and associated perspective view of the person.

31 Claims, 21 Drawing Sheets

(56) References Cited

U.S. PATENT DOCUMENTS

| | | | |
|---|---|---|---|
| 6,999,599 B2* | 2/2006 | Rui et al. | 382/103 |
| 7,130,446 B2* | 10/2006 | Rui et al. | 382/103 |
| 2002/0097848 A1 | 7/2002 | Wesemann | |
| 2002/0122113 A1 | 9/2002 | Foote | |
| 2002/0176603 A1* | 11/2002 | Bauer et al. | 382/103 |
| 2002/0191071 A1 | 12/2002 | Rui et al. | |
| 2003/0058340 A1* | 3/2003 | Lin et al. | 348/159 |
| 2003/0103647 A1 | 6/2003 | Rui et al. | |
| 2003/0156762 A1* | 8/2003 | August | 382/260 |
| 2005/0128291 A1* | 6/2005 | Murakami | 348/143 |

OTHER PUBLICATIONS

Beymer, D., "Face Recognition Using Varying Pose," Proc. 1994 IEEE Conf. on CVPR., pp. 756-761, Jun. 1994.

Bregler, C. and J. Malik, "Tracking People with Twists and Exponential Maps," Proc. IEEE Conf. on Comp. Vis. Patt. Recog., pp. 8-15, 1998.

Bregler, C., "Learning and Recognizing Human Dynamics in Video Sequences," Proc. IEEE Conf. on CVPR, Jun. 1997, pp. 568-574.

Chandrasekaran, S., B.S. Manjunath, Y.F. Wang, J. Winkeler, and H. Zhang, "An Eigenspace Update Algorithm for Image Analysis," Graph. Models and Image Processing. vol. 59, No. 5, pp. 321-332, Sep. 1997.

Donato, G., M. Bartlett, J. Hager, P. Ekman, and T. Sejnowski, "Classifying Facial Actions," IEEE Trans. On PAMI, vol. 21, No. 10, pp. 974-989, Oct. 1999.

Gavrilla, D. and L S.. Davis, "3D Model-based Tracking of Humans in Action: A Multi-view Approach," Proc. IEEE Conf. on CVPR, p. 73-80, 1996.

Haritaoglu, I., D. Harwood, and L. Davis, "W4: Who? When? Where? What? A Real Time System for Detecting and Tracking People," Proc. IEEE Int'l. Conf. on Automatic Face and Gesture Recognition, Nara, Japan, pp. 222-227, Apr. 1998.

Horprasert, T., I. Haritaoglu, D. Harwood, L. Davis, C. Wren, and A. Pentland, "Real-Time 3D Motion Capture," Proc. PUI, Nov. 1998, 4 pages.

Huang, K. and M. Trivedi "Networked Omnivision Arrays for Intelligent Environment," Proc. SPIE Conf. on Applications and Science of Neural Networks, Fuzzy Systems, and Evolutionary Computation IV, vol. 4479, pp. 129-134, Jul.-Aug. 2001.

Huang, K. and M. Trivedi, "Streaming Face Recognition using Multicamera Video Arrays," Proceedings of the 16th International Conference on Pattern Recognition, ICPR 2002, vol. IV: Thursday, Aug. 15, 2002, pp. 213-216.

Huang, K.S. and M.M. Trivedi, "Driver Head Pose and View Estimation with Single Omnidirectional Video Stream," Proceedings of the 1st International Workshop on In-Vehicle Cognitive Computer Vision Systems, in conjunction with the 3rd International Conference on Computer Vision Systems, Graz, Austria, pp. 44-51, Apr. 3, 2003.

Huang, K.S. and M.M. Trivedi, "Video arrays for real-time tracking of person, head, and face in an intelligent room," Machine Vision and Applications 14: 103-111 (2003).

Huang, K.S. and M.M.Trivedi, "Video Arrays for Real-Time Tracking of Persons, Head and Face in an Intelligent Room," Machine Visions and Applications, Omnidirectional Vision, Special Issue, Oct. 2001 (25 pages).

Juang, B.H., "Maximum-Likelihood Estimation for Mixture Multivariate Stochastic Observations of Markov Chains," AT &T Tech. J. vol. 64, No. 6, pp. 1235-1249, Aug. 2000.

Mikic, I., K. Huang, and M. M. Trivedi, "Activity Monitoring and Summarization for an Intelligent Meeting Room," Proc. IEEE Workshop on Human Motion, pp. 107-112, Dec. 2000.

Mikic, I., M. M. Trivedi, E. Hunter, and P. Cosman, "Articulated Body Posture Estimation from Multi-Camera Voxel Data IEEE," Int'l. Conf. on Comp. Vis. And Patt. Recog. Kauai, Hawaii, Dec. 2001, pp. I-455-I-460.

Nayar, S., "Catadioptric Omnidirectional Camera," Proc. IEEE Conf. on Comp. Vis. Patt. Recog., pp. 482-488, Jun. 1997.

Naynr, S., and T. Boult, "Omnidirectional Vision Systems: 1998 PI Report," Proc. DARPA Image Understanding Workshop, Monterey, CA, Nov. 20-23, 1998, pp. 93-99.

Onoe, Y., N. Yokoya, K. Yamazawa, and H. Takekmura, "Visual Surveillance and Monitoring System Using an Omnidirectional Video Camera," Proc. Int'l. Conj on Patt. Recog., pp. 588-592, Aug. 1998.

Pentland, A., T. Choudhury, "Face Recognition for Smart Environments," IEEE Computer, vol. 33, No. 2, pp. 50-55, Feb. 2000.

Prati, A., I. Mikic, C. Grana, and M. Trivedi, "Shadow Detection Algorithms for Traffic Flow Analysis: A Comparative Shady," IEEE Intelligent Transporation Systems Conference Proceedings, Oakland, CA Aug. 25-29, 2001, pp. 340-345.

Rabiner, L., "A Tutorial on Hidden Markov Models and Selected Applications in Speech Recognition," Proc. IEEE. vol. 77, No. 2, pp. 257-286, Feb. 1989.

Sogo, T. et al., "N-Ocular Stereo for Real-Time Human Tracking," in Panoramic Vision (R. Benosman and S.B. Kang (Eds.), Springer-Verlag, pp. 359-375 (2001).

Sogo, T. et al."Real-Time Target Localization and Tracking by N-Ocular Stereo," Proc. IEEE Workshop on Omnidirectional Vision, pp. 153-160 (Jun. 2000).

Stiefelhagen, R., J. Yang, and A. Waibel, "Simultaneous Tracking of Head Poses in a Panoramic View," Proc. Int'l Conf on Patt. Recog., Sep. 2000.

Trivedi, M.M., K. Huang, and I. Mikic, "Intelligent Environments and Active Camera Networks," Proc. IEEE Int'l. Conf. SMC., pp. 804-809, Oct. 2000.

Tsai, R. "A Versatile Camera Calibration Technique for High-Accuracy 3D Machine Vision Metrology Using Off-the-Shelf TV Cameras and Lenses," IEEE J. of Robotics and Automation, vol. RA-3, No. 4, pp. 323-344, Aug. 1987.

Turk, M. and A. Pentland, "Face Recognition Using Eigenfaces," Proc. IEEE Conf on CVPR, pp. 586-591, Jan. 1991.

Weng, J., C.H. Evans, and W.S. Hwang, "An Incremental Method for Face Recognition under Continuous Video Stream," IEEE Conf. on Auto. Face and Gesture Recog., pp. 251-256, Mar. 2000.

Wren, C., A. Azarbnyejnni, T. Darell, and A. Pentland, "Pfinder: Real-Time Tracking of the Human Body," IEEE Trans. on Pattern Analysis and Machine Intelligence, vol. 19, No. 7, pp. 780-785, Jul. 1997.

Yamaguchi, O., K. Fukui, and K. Maeda, "Face Recognition using Temporal Iamge Sequence," Proc. IEEE Conf. On Auto. Face and Gesture Recog., pp. 318-323, Apr. 1998.

Lee, C.H., et al., "On adaptive decision rules and decision parameter adaptation for automatic speech recognition," Proceedings of the IEEE, 88(8):1241-1269, Aug. 2000.

Mikic, I., et al. "Tracking Objects in 3D using Multiple Camera Views", Proc. ACCV 2000, Taipei, Taiwan, pp. 234-239, Jan. 2000.

* cited by examiner

FIG. 9C FIG. 9D
 
 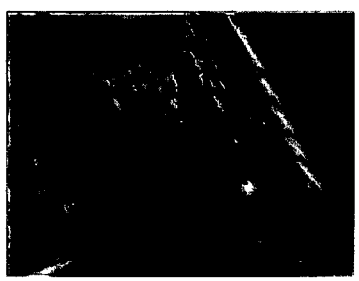
FIG. 9E FIG. 9F
FIG. 10

FIG. 31
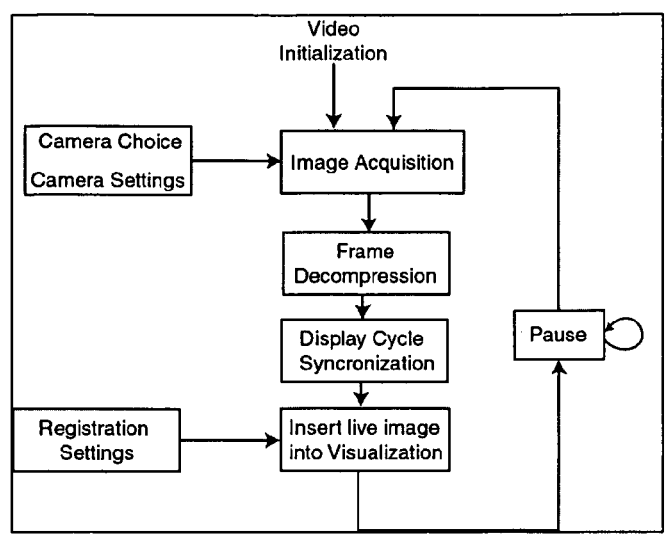
FIG. 32A     FIG. 32B     FIG. 32C

DIGITAL PROCESSING OF VIDEO IMAGES

This application is a national stage application of and claims the benefit of PCT/US03/20922 filed on Jul. 1, 2003, which claims the benefit of U.S. Provisional Application No. 60/393,480 entitled "Digital Tele-viewer" and filed Jul. 1, 2002. Both applications are incorporated herein by reference in their entirety.

BACKGROUND

This application relates to digital imaging and machine vision, and in particular, to digital processing of digital video images and related applications.

Video cameras have been used to capture video images for various applications such as surveillance, machine vision, security monitoring, inspection, sensing and detection. In these and other applications, the captured video images may be sent to a nearby or remote image processing device to be processed and displayed. Digital image processing techniques may be used to process the video images to extract information from the video images.

Certain video cameras are designed with optical imaging modules to capture wide-angle or panoramic video images. Such video images are distorted due to the designs of various optical imaging modules. Digital imaging processing may be used to transform the distorted images into images that a viewer would normally perceive when directly look at the scene being captured.

SUMMARY

This application includes, among other features, implementations of video systems and digital processing techniques for delivering wide-angle or panoramic video signals to one or more video processing devices and digitally processing the panoramic video signals at each video processing device for various applications. The video signals may be transmitted to one or more receivers through a secured server that places certain restrictions on the video signals that are transmitted to the receivers. For example, certain information in the originally captured video signal may be removed to produce a "redacted" video signal to a selected receiver to provide a limited access. The digital processing techniques include, for example, methods to efficiently transform warped video images into rectilinear video images, real-time tracking of persons and objects, face recognition of persons, monitoring and tracking head pose of a person and associated perspective view of the person. Systems that include one or more of these and other features may be devised for various applications.

In one implementation, the digital processing includes a digital tele-viewer module comprising a perspective transformation part that computes unwarped image pixel positions for a set of input pan, tilt, and zoom parameters of the corresponding video camera. A look-up-table is included to provide correspondence between image coordinates on the warped image and unwarped image pixel positions for a given set of input pan, tilt, and zoom parameters so that the unwarped image may be formed from the image pixels taken from input warped video image from the video camera. In another implementation, the digital processing may include a module for detecting a person's head and determining and tracking the person's face orientation based on edge detection, ellipse detection, head pattern recognition, and the Kalman filtering for head tracking. This module allows for extracting the person's view when a panoramic video is taken. Furthermore, the digital processing may include video-based face recognition to identify persons in the captured video against a face image database.

A technique for 3D real-time tracking of persons is also described to use multiple panoramic video camera arrays. This technique may be combined with the digital tele-viewer module, the face recognition module, and the module for detecting a person's head and determining and tracking the person's face orientation in an intelligent room system.

These and other implementation, features, and associated applications are described in detail in the following drawings, the detailed description, and the claims.

BRIEF DESCRIPTION OF THE DRAWINGS

FIGS. 9C, 9D, 9E, 9F, and 10 show exemplary customized images from the digital tele-viewer module for the camera in FIG. 7.

FIG. 31 shows one implementation for overlaying the live DTV video over a digital image.

FIGS. 32A, 32B, and 32C illustrate examples of overlaying a live video over a digital map.

DETAILED DESCRIPTION

A video system may use a video camera and a video processing device that are spatially separate from each other so that the video captured by the video camera at one location may be processed and viewed through the video processing device at a different location. This video system allows for remote sensing and may be used in various applications.

Such a video system may be used in situations where it is desirable or necessary that an operator or user of the video system is absent from the location of the video camera. For example, in security and anti-terrorism video systems, a network of video cameras may be installed in critical locations such as airports, bus and train stations, military bases, etc. The video signals can be remotely processed and used by various state and federal authorities. As another example, such a video system may be installed in vehicles to assist pilots, drivers, and security personnel to monitor the passenger cabin and luggage cabin. Such video systems may also be installed at critical places to help security personnel monitor critical sites for any unusual situations, including sites where humans are impossible to enter such as nuclear reactors, areas exposed to toxic agents, and other hazardous areas. Furthermore, such video systems may be deployed on a crisis site to assist police, fire department, physicians, and the crisis management commander to monitor the situations of their responsibility, and when permissible, to inform relatives of victims of the most up-to-date rescue progress in real-time without interfering the rescue actions. In visual surveillance, such video systems allows a site of interest to be viewed by remote users like the host or the police department through a proper communication link such as the Internet or other computer networks at any time and simultaneously.

Other applications may be possible. For example, one or more video cameras may be installed in a vehicle to monitor the driver's head pose and face orientation as a part of a safety alert system, e.g., to warn the driver when the driver's direction of view is away from the front direction of the vehicle beyond a permissible period during driving. The video processing device may be located at a different location in the vehicle, e.g., as part of the on-board computer system of the vehicle.

Figure 1:
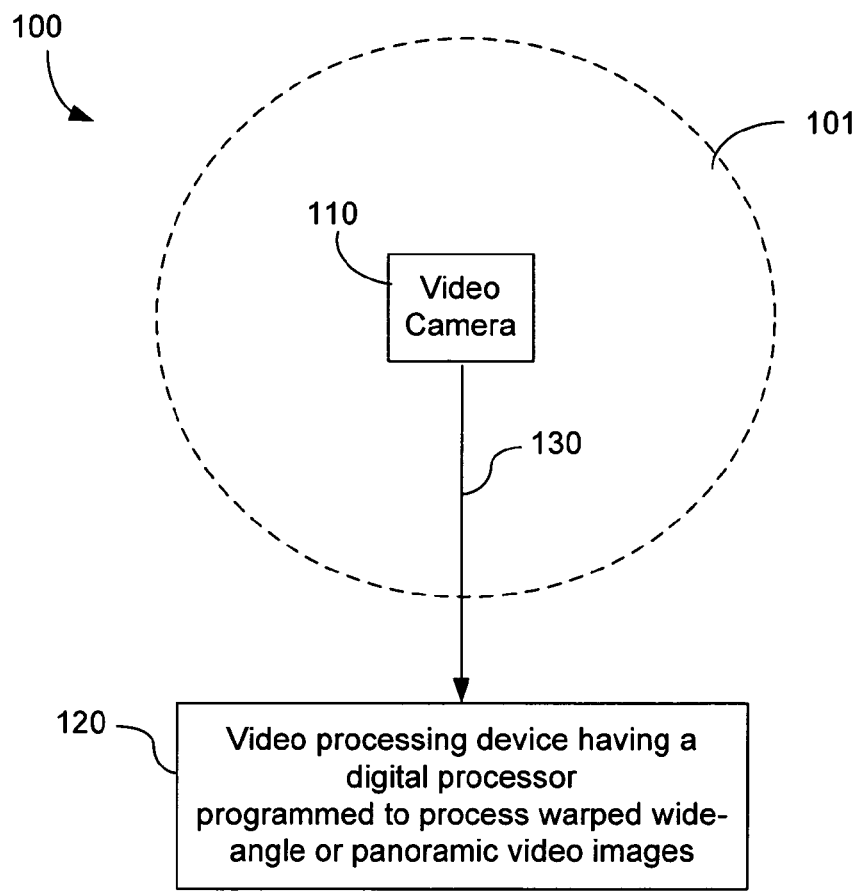
FIG. 1 shows a general system configuration according to one implementation of a digital video system.

FIG. 1 illustrates one example of a video system 100 where a video camera 110 is installed at a location 101 to capture a video of the location 101. In general, the video camera 110 may have an optical imaging system to capture either the wide-angle or the panoramic view of the location 110. As one exemplary implementation of a panoramic video camera, the video camera 110 may be an omni-direction video camera to capture a full 360-degree view of the location 101 surrounding the camera 110 in an inside-out-coverage configuration. A video processing device 120 is located at a different location and is linked to the video camera 110 by a communication link 130 to receive the video signal. The communication link 130 may be a wired link, a wireless link, or a combination of both. In some applications, the communication link 130 may include one or more communication networks such as the Internet to deliver the video signal from the video camera 110 to the video processing device 120. The communication link may use, among other links, a wired link for high bandwidth or a wireless link such as a wireless 802.11 protocol for high mobility.

The video processing device 120 includes a digital processor that is programmed to process the warped wide-angle or panoramic video images to extract desired information. The video processing device 120 may be a desktop computer, a portable electronic device such as a PDA or a cell phone. The digital processing modules such as the DTV module described below may be designed to operate on multiple platforms: workstations, desktop computers, laptop computers, TabletPCs, PDAs, etc. The DTV module, for example, may use the Java implementation which utilizes Java Virtual Machine on various platforms and various operating systems.

In one implementation, the digital processor may be programmed, among other features and functions, to transform the warped video images into rectilinear video images and allow the user to digitally control the pan, tilt, and zoom of the video to customize the view. This part of the digital processor is referred to as the "digital tele-viewer" (DTV) in part because it enables remote customized viewing of the video images. Notably, different users may view the same video stream simultaneously with different customized viewing settings, such as different pan, tilt, and zoom parameters. Each user may customize the viewing settings without interfering customized viewing of the same view stream by other users.

Figure 2:
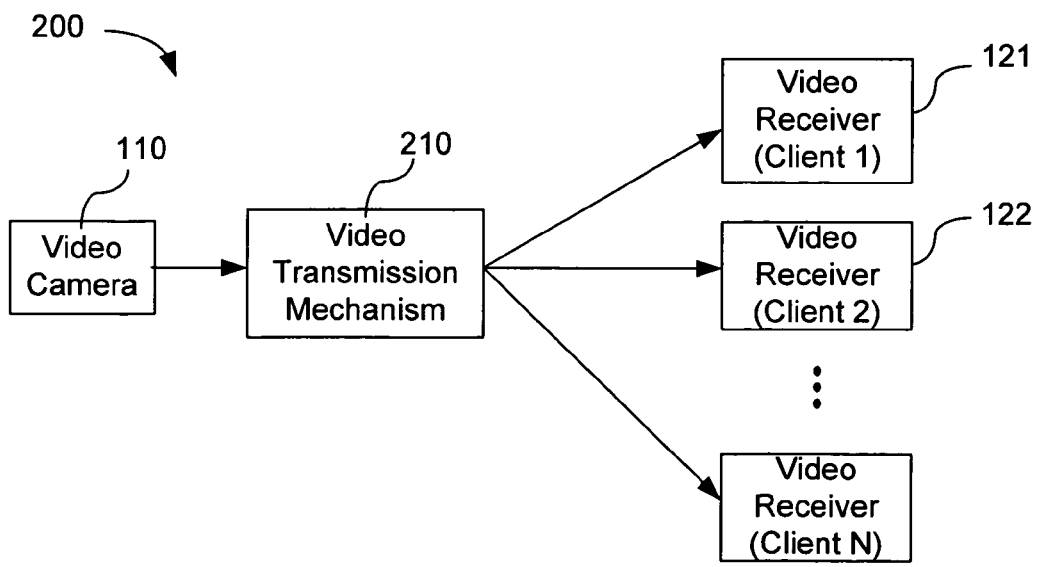
FIGS. 2, 3, and 4 show specific examples of digital video systems.

FIG. 2 depicts an exemplary video system 200 that includes two or more video processing devices 121 and 122 connected to receive the same video signal from the video camera 110. A video transmission mechanism 210 is used to simultaneously deliver the video signal from the video camera 110 to the video processing devices 121, 122, etc. The video signal being delivered may be in a digitally compressed form. The digital processors in the devices 121 and 122 uncompress the video signal and allow for different customized views by two different users from the same video signal. In operation, the digital tele-viewer takes a remote omni-camera video and unwarps it into rectilinear videos of any pan-tilt-zoom settings. The same video stream may be shared among multiple people and each person can generate a perspective view of the person's interest. The multi-user digital tele-viewing is generally difficult, if not possible, by using mechanical pan-tilt-zoom (PTZ) cameras because most mechanical PTZ cameras can be used by only one user to look at one point at any time instance. When an omni-camera is used to capture the video images with a 360-degree view, digital tele-viewer may be used to generate various different PTZ rectilinear views for all users who want to look at different points from the same omnicam.

Figure 3:
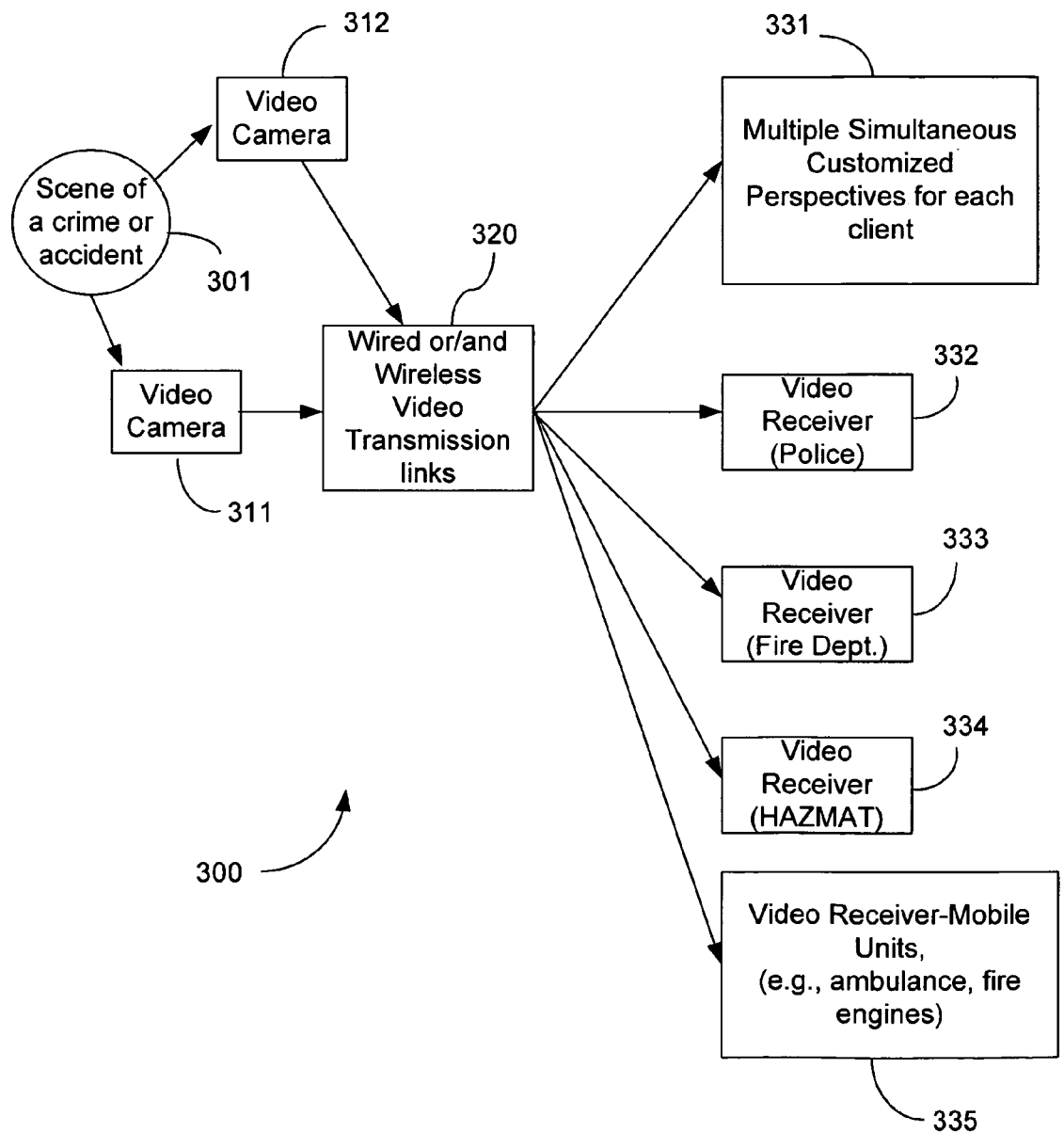

Certainly, two or more video cameras may be connected to the video transmission mechanism 210 in the system 200 to deliver different video signals to the devices 121, 122, etc. FIG. 3 shows an exemplary video system 300 for monitoring a scene of a crime or accident 301 by two or more video cameras (311, 312, etc.) based on the multi-user video system 200 in FIG. 2. The video signals from the video cameras 311, 312, etc. are sent to multiple video receivers via video transmission links 320 which may be wired or wireless channels. The video receiver 331 may be located in a dispatch center to process the video signals to produce multiple simultaneous customized perspective views of the scene 301. Based on the information from the video signals, the dispatch center may send commands to dispatch appropriate units to the scene 301, e.g., police 332, fire department 333, hazardous material control units (HAZMAT) 334, or mobile units 335 such as ambulance or fire engines. The police, the fire department, and other units may also have video receivers to directly receive live video signals from the cameras 311, 312 and to monitor the scene 310 via their customized views. Therefore, with the aid of this video system 300, different units from the dispatch center to the rescue agents can obtain valuable live visual video images of the scene 310 and thus cooperate in a highly aware manner. For example, with the aid of the real-time DTV at each video receiver, appropriate rescue actions can be prepared before arriving the crisis site, and lives can be saved by shorten delays. Moreover, even relatives of victims can know the most up-to-date rescue progress in real-time without interfering the rescue actions.

It is recognized that, however, the scope of access to information in the video signal by different users may be different in certain applications. In this regard, a video server may be connected in the communication links between the video camera and the remote client users to filter or edit the video signal to produce different "redacted" or "tailored" versions of the original video signals with different contents. For example, for a selected client user, the video server may remove video images for certain scenes, e.g., a view within a selected arc angle of the 360-degree view, and deliver the video images of the remaining scenes so that the selected client user has no access to the removed video images. Such filtering or editing may be predetermined or may change dynamically with time at the video server. This video server in general may be a public server or a secured server.

Figure 4:
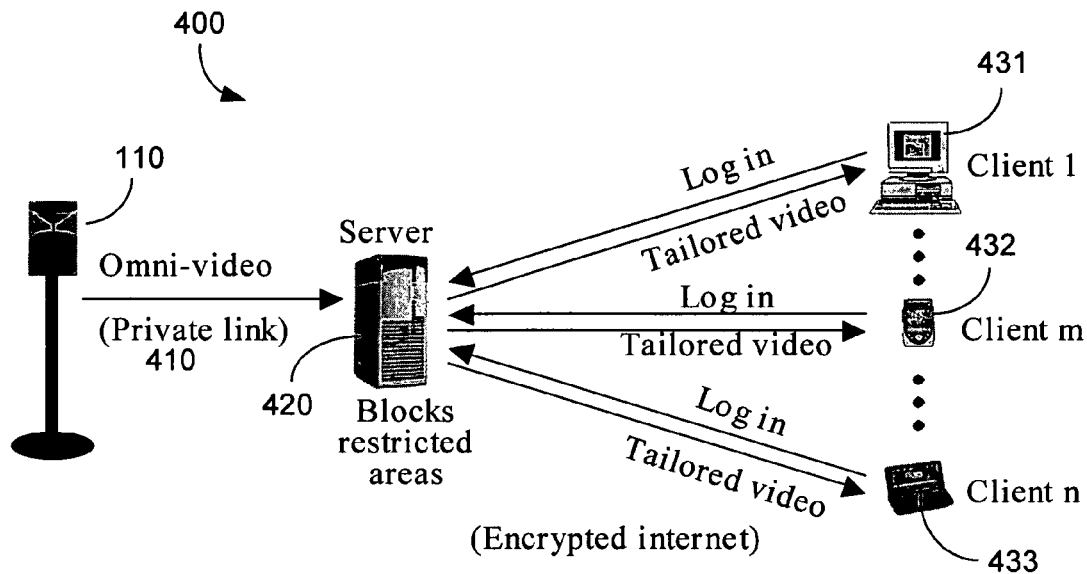

FIG. 4 illustrates a secured video system 400 that includes a secured video server 420 and a secured transmission link between the video camera 110 and the server 420. To ensure the secured delivery of video signals, different clients 431, 432, and 433 may need to log in to the server 420 in order to receive video signals originated from one or more video cameras 110. The server 420 may be programmed to store the client profiles that include client data on scope of access. Based on this client data, the server 420 blocks out restricted areas in the video signals for a particular client and delivers the tailored video signals. In addition, the transmission between the server 420 and the clients may use either secured transmission channels or other communication channels such as the Internet with data encryption to secure the transmission.

In certain implementations, the secured server 420 in the system 400 may be configured to permit various security levels for the clients. For example, a high level client may be allowed to have unrestricted video, while a lower level client may be restricted to receive some part of the video with certain views in the video being blocked by the secured server after editing. The scope of the restricted part in an edited video may be dynamically adjusted so that the blockage of the video for certain clients changes over time. This change in blockage may be based on a change of a user's level of security or a change in the scene captured in the video. As an example of the latter, the video of an aircraft carrier parked in a military harbor may be blocked to the public but open to navy officers. As the aircraft carrier moves, the blockage moves with it. The same scenario may apply to airplanes, vehicles, and persons. Techniques to implement this time-varying video blockage involve detection and tracking of motion of an object or person as described in this application. For high security, the video streams from the server can be encrypted.

The following sections describe exemplary digital processing mechanisms and functions in the digital processor in each video processing device for a client or user. In general, the digital processor may be implemented by using a general computer, such as a computer with a microprocessor. The digital processing mechanisms and functions may be implemented with software modules that are stored in one or more machine-readable memory devices and can be executed by the computer.

One basic component of the digital processing is the digital tele-viewer (DTV) that unwarps the warped wide-angle or panoramic video signals received by the digital processor into rectilinear videos of any pan, tilt, and zoon settings. As a result, a client may choose any perspective available in the original video signal and different clients may simultaneously choose different perspective views, entirely independently from one another without affecting another client's viewing, in the same video signal from a video camera.

The video camera may include an optical imaging module that captures the wide-angle or panoramic view of a scene, and an array of photosensors such as CCDs or other suitable sensors to receive and convert optical images from the optical imaging module into electronic signals. Due to the nature of the wide-angle or panoramic imaging, the optical imaging module generally warps or distorts the video images. The array of photosensors may be a planar 2D array and thus the optical images projected on the array are warped. For a given optical configuration of the optical imaging module, a warped image at the 2D array may be mathematically transformed into a rectilinear perspective image. This perspective transformation may be implemented in the DTV software.

Figure 5:
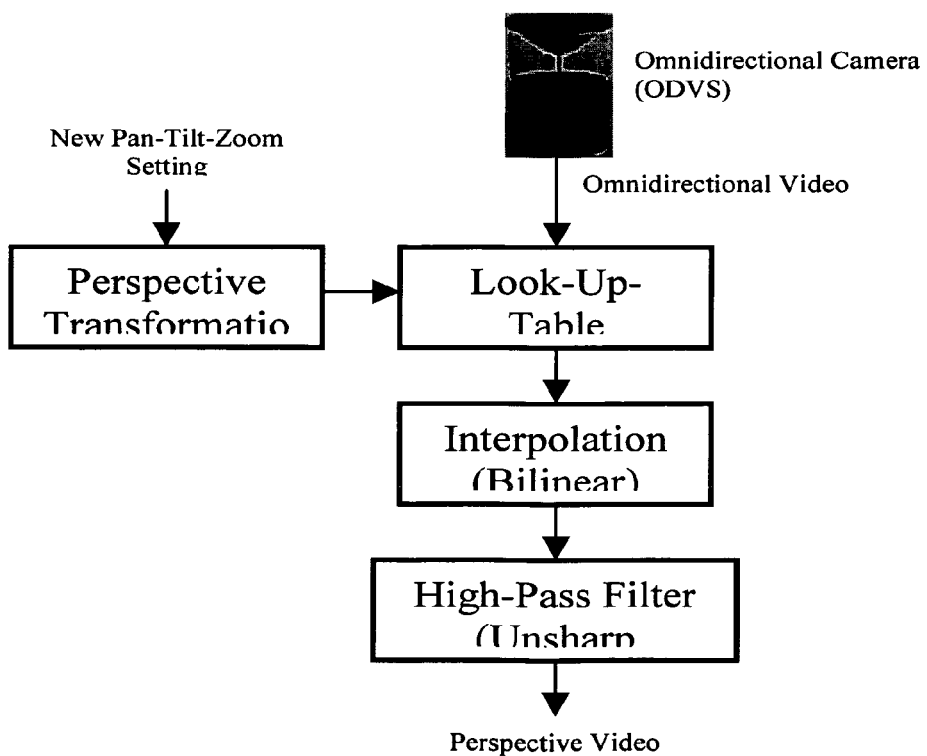
FIG. 5 shows one exemplary implementation of digital image transformation from a warped video to a rectilinear video based on a look-up table.

FIG. 5 shows one implementation of the DTV perspective view generation. Upon initialization and each request of new pan-tilt-zoom (PTZ) settings for the perspective view, the PTZ values are sent to the perspective transformation module to unwarp a portion of the warped wide-angle or panoramic image into a perspective view by updating a look-up-table. The look-up-table includes data that directs to the corresponding image coordinates on the warped image for each pixel of the unwarped perspective image. This use of the look-up-table speeds up the process because the values of the look-up-table need to be computed only once if the PTZ value is not changed. With the values of the look-up-table for a given set of PTZ values, the unwarped perspective image can be formed by filling the pixels with the corresponding pixels in the warped image. In general, the corresponding warped image coordinates may not be integers, i.e., they may be located between the adjacent warped image pixels, an image interpolation may be used to compute the unwarped image pixels.

Figure 6:
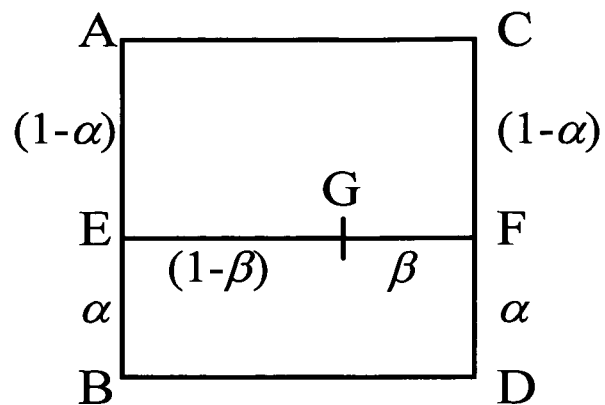
FIG. 6 shows one example of image interpolation used in FIG. 5.

In one implementation, the interpolation may be a bilinear interpolation. FIG. 6 illustrates the operation of this method. For given pixel values A, B, C, and D at integer coordinates of adjacent pixels, the non-integer coordinate pixel G to be interpolated can be calculated by using the following equations:

$$E = \alpha A + (1-\alpha)B,$$

$$F = \alpha C + (1-\alpha)D,$$

$$G = \beta E + (1-\beta)F.$$

where $\alpha$ and $\beta$ have values between 0 and 1. Hence, G's coordinates are computed as weighted averages of the coordinates of the adjacent pixels A, B, C, and D.

Referring back to FIG. 5, after the interpolation, the image may be optionally enhanced by a high-pass filter which is carried out by unsharp masking. The output of this filtering is the unwarped perspective video. This video can then be viewed or further processed to extract information as specified by a user.

The perspective transformation in FIG. 5 is specific to the optical configuration of the optical imaging module of the video camera. A transformation for an omnidirectional camera with a hyperboloidal mirror is described here as an example to illustrate the transformation. This optical imaging module produces a full 360-degree omnidirectional image (ODI) in an inside-out-coverage.

Figure 7:
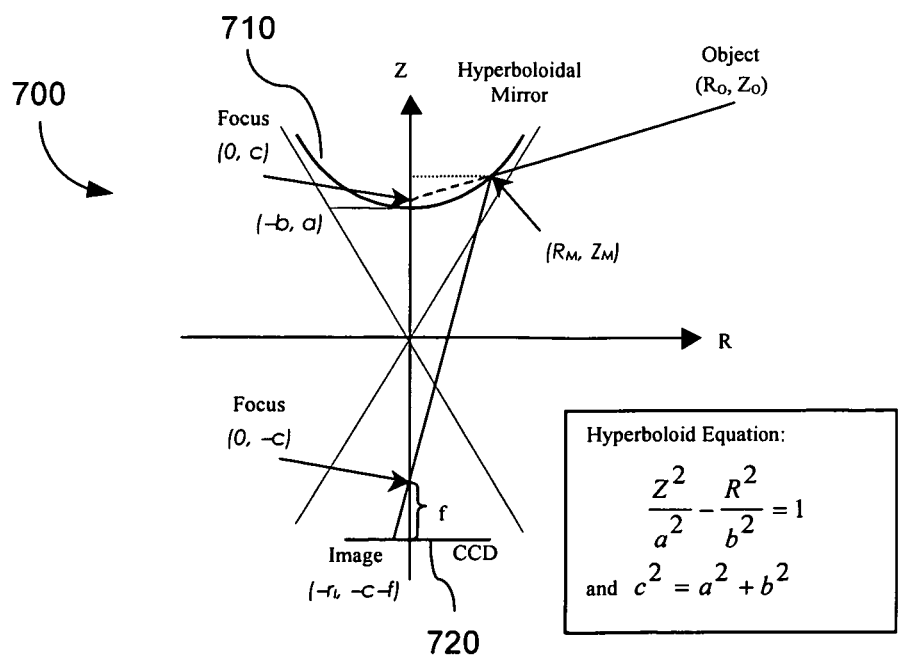
FIGS. 7 and 8 show imaging transformation for an omnidirectional video camera having a hyperboloidal reflector.

FIG. 7 shows the optical imaging module 700 using a hyperboloidal mirror 710 and a planar 2D CCD sensing array 720. The hyperboloid equation for the mirror 710 can be written as follows:

$$\frac{Z^2}{a^2} - \frac{R^2}{b^2} = 1,$$

where $c^2 = a^2 + b^2$. Based on the optical property of the hyperboloid, all light coming through the upper focus at $(0, c)$ will be reflected by the mirror to go through the lower focus at $(0, -c)$. If the lens center of the CCD camera 720 is located at the lower focus at $(0, -c)$, then the ODI will be formed on the CCD plane 720 at the plane below the lower focus by a distance f of the focal lens of the CCD camera lens. The net effect is that the viewing of the CCD camera 720 is converted from a narrow angle upward out of its lens to a downward hemisphere viewing from the upper focus at $(0, c)$. The one-to-one correspondence between the object point and the CCD image point can be derived from the geometry shown in FIG. 7 and the hyperboloid equation for the mirror 710.

Parameters involved in the transformation are a, b, and c of the hyperboloid mirror 710 and the focal length f of the CCD camera lens. By solving the equations, the coordinates $(R_M, Z_M)$ for the location where a ray is reflected on the mirror 710 can be computed. Then the CCD image location $r_r$ of the object point can be determined. With this mapping, the panoramic image can be projected from the 360-degree omnidirectional image (ODI) to a hypothetical cylindrical screen around the upper focus. Given the coordinate of the points on the cylindrical screen, the corresponding pixel on the CCD plane 720 can be derived. Thus a panorama can be unwarped from an ODI.

Digital PTZ generates a rectilinear perspective view from an ODI. A perspective view is a planar view from a single viewing point at the upper focus $(0, c)$ and may be generated by finding the relationship between the points on the planar perspective screen and the points on the CCD plane 720.

Figure 8:
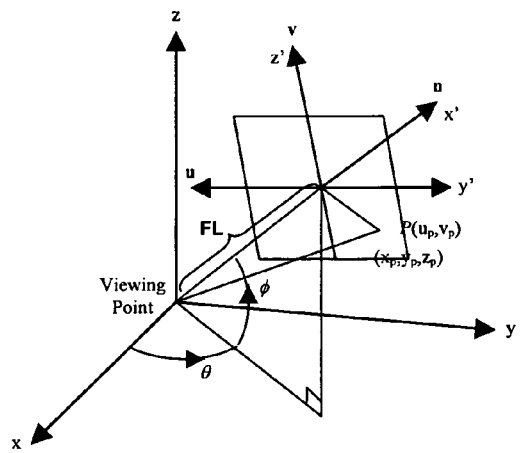

FIG. 8 illustrates the perspective view geometry, where the normal vector n of the perspective screen is rotated by a pan angle $\theta$ horizontally from the x-axis and by a tilt angle $\phi$ vertically above (or below) the xy-plane. The displacement of the perspective screen from the viewing point along n is the effective focal length (FL), which is the zooming factor. Vectors u and v are the unit vectors of the horizontal and vertical axes of the perspective screen, respectively. By finding the representations of n, u, and v in terms of x-y-z coordinates, a pixel $(u_p, v_p)$ on the perspective screen can find its x-y-z representation. Then its coordinates can be projected onto the CCD plane by the formulae derived from FIG. 7. Thus the perspective view can be painted by the corresponding ODI pixel values, with or without interpolations.

More specifically, the perspective view can be generated from the ODVS image by the ODVS geometry. This perspective view is a rectilinear screen whose viewing point is at the upper focus of the hyperboloid mirror of the ODVS, as shown in FIG. 8. The lower focus of mirror is at the optical center of the CCD lens. The rectilinear screen can be specified by the pan angle $\theta$, the tilt angle $\phi$, and the effective focal length FL for zooming. The normal vector n and unit vectors u and v of the rectilinear screen can be represented in terms of the 3D x-y-z coordinate system as $$n = R \begin{bmatrix} 1 \\ 0 \\ 0 \end{bmatrix}, u = R \begin{bmatrix} 0 \\ -1 \\ 0 \end{bmatrix}, v = R \begin{bmatrix} 0 \\ 0 \\ 1 \end{bmatrix}$$

where R is the rotation matrix which rotates the x'-y'-z' coordinates to x-y-z coordinates in FIG. 8.

$$R = \begin{bmatrix} \cos\theta\cos\phi & -\sin\theta & -\cos\theta\sin\phi \\ \sin\theta\cos\phi & \cos\theta & -\sin\theta\sin\phi \\ \sin\phi & 0 & \cos\phi \end{bmatrix}$$

Thus a screen point P in u-v coordinate $(u_p, v_p)$ can be related to the 3D x-y-z system by $$\begin{bmatrix} x_P \\ y_P \\ z_P \end{bmatrix} = u_P u + v_P v + FLn = R \begin{bmatrix} FL \\ -u_P \\ v_P \end{bmatrix}$$

Next the x-y-z coordinates of P can find its associated pixel $(C_x - r_I x_P / r_P, c_y - r_I y_P / r_P)$ in CCD plane of the ODVS, where $(c_x, c_y)$ is the center pixel of the ODVS image, $r_P = \sqrt{x_P^2 + y_P^2}$, and $$r_I = \frac{f \cdot r_M}{z_M + 2c} = \frac{f \cdot r_M}{z_M + 2\sqrt{a^2 + b^2}}$$

with $$r_M = \frac{mc + a\sqrt{1 + m^2}}{(a^2/b^2 - m^2)}$$

$$z_M = m \cdot r_M$$

$$m = \frac{z_P}{r_P}$$

The above equations can be represented in polar coordinates. Hence, applications based on the transformation, such as head and face tracking described in later sections, can be carried out by calculating the $\theta$, $\phi$, and FL of human head with respect to the chosen ODVS according to the relative 3D location of the human head and the ODVS. Notably, this process allows users to specify the pan, tilt, and zoom factors to zoom into human face or any other object of interest in the captured video signals via the graphical user interface.

Figure 9A:
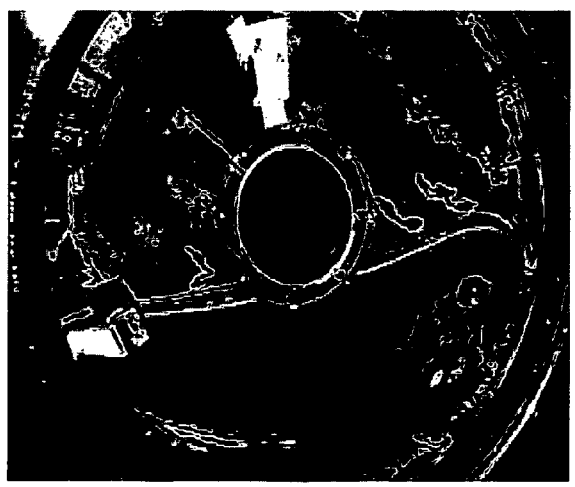
FIGS. 9A and 9B show warped omnidirectional video image of the camera in FIG. 7 and an user interface for adjusting pan, tilt, and zoom of a customized view.
Figure 9B:
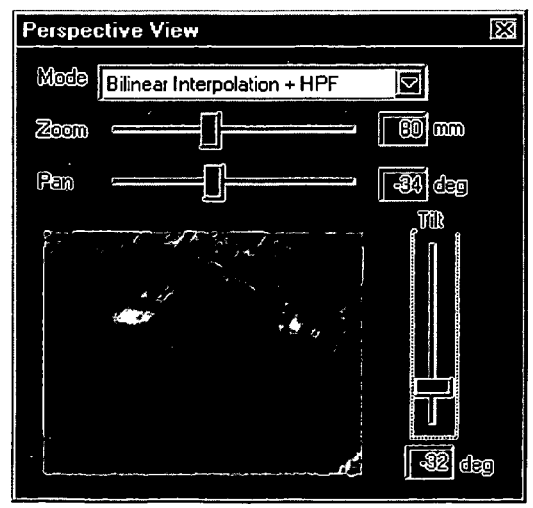

FIG. 9A shows an example of a warped 360-degree image from the video produced by an omnidirectional video camera. FIG. 9B show a user graphic interface of the DTV in the digital processor where user controls for pan, tile, and zoom are shown. This user interface allows a user to select any PTZ values to select any scene captured by the video camera. Multiple such windows may be opened by a user to get different video images with different PTZ values of the captured scene. FIGS. 9C and 9D show two perspective views of a video image from FIG. 9A with different zoom values. FIGS. 9E and 9F show two perspective views of another video image from FIG. 9A with different zoom values.

The digital processing for the digital processor may also include an optional software module for a person's head pose and view estimation based on a streaming panoramic video from, e.g., the above omnidirectional video camera. This feature may be used to monitor a person's face orientation and his perspective view. This processing module may be used in automobiles or other vehicles to monitor the driver and may be used as a part of the vehicle safety system. In implementations, this software module may be combined with the DTV module to operate based on unwarped video by the DTV.

In applications for estimating driver's face orientation and generate driver's view, an omnidirectional video camera may be mounted in the vehicle interior to capture panoramic video images of both the driver's head and the images in the driver's view. This software module should be robust to variations in illumination present in the typical operating interior environment. The processing time of the software module should be sufficiently fast relative to the movement of the person to provide real-time monitoring for intelligent car systems and other applications.

For example, driver distraction is an important issue in developing advanced telematic systems. To help reducing distractions such as driver's fatigue and use of cell phone, a mobile machine vision system based on the above video system can be developed to actively alert the driver according to the driver status and the traffic conditions. The above video system may be implemented as part of a driver assistance system "Visual Context Capture, Analysis and Televiewing (VCAT)" where a remote caller receives the streaming video from the camera in the vehicle and actively control a conversation with the driver to assist the driver operating the vehicle. This system derives visual context information on the driver and the traffic conditions. These cues could be used to alert the driver, e.g., to be used by the remote caller to change the conversational style according to events in or around the car. Thus the VCAT system provides a telepresence experience to the remote caller like a passenger sitting in the car and estimates the attentive load of the driver and mitigates the conversation by audio-visual warnings.

In implementations of the VCAT system and other driver assistance systems, a full coverage of the interior space and the dynamic scene outside of a vehicle must be captured for both televiewing and video context analysis purposes. One or more omnidirectional video cameras may be used to automatically support event synchronization among in-vehicle and surroundings since they are captured in one shot. Such a camera may be used to extract preliminary visual context at lower resolution and higher processing speed, and possibly drive a few rectilinear cameras where higher resolution video is needed.

FIG. 10 shows that multiple perspective views can be simultaneously generated from the omnicam video on the driver, passengers, and surroundings by a nonlinear transformation with any pan, tilt, and zoom values. This may be achieved by opening multiple control windows shown in FIG. 9B. This enables the VCAT system to analyze driver's viewing direction from the driver video and also generate simultaneous driver's view from the omnicam video. Using these videos, the attentive status and workload of driver can be estimated, possibly with other information such as facial expression and maneuvering of car. Such viewing feature allows the VCAT system to decide when to mitigate cellular phone conversation. Meanwhile, with the analysis of the surrounding traffic conditions, the system can detect potential risks to which the driver is not paying attention and warn the driver appropriately.

In order to generate instantaneous driver's view, the driver's head is detected and tracked to extract driver's face and to determine the driver's face orientation. Then the driver's viewing direction is estimated from driver's face orientation. Next, the perspective view seen by driver can be generated from the omni-video parallel to driver's viewing direction. For car interior environments, it is possible that the traditional skin-tone based face detection in indoor situations may no longer be feasible because of the drastically changing illumination conditions both in lightness and in color. The head and face detection algorithm should be robust to illumination change and insensitive to color. In this regard, an edge detection method may be used in part because it only relies on contrasts in the image. From the edge map, the driver's head can be located by ellipse detection.

Figure 11:
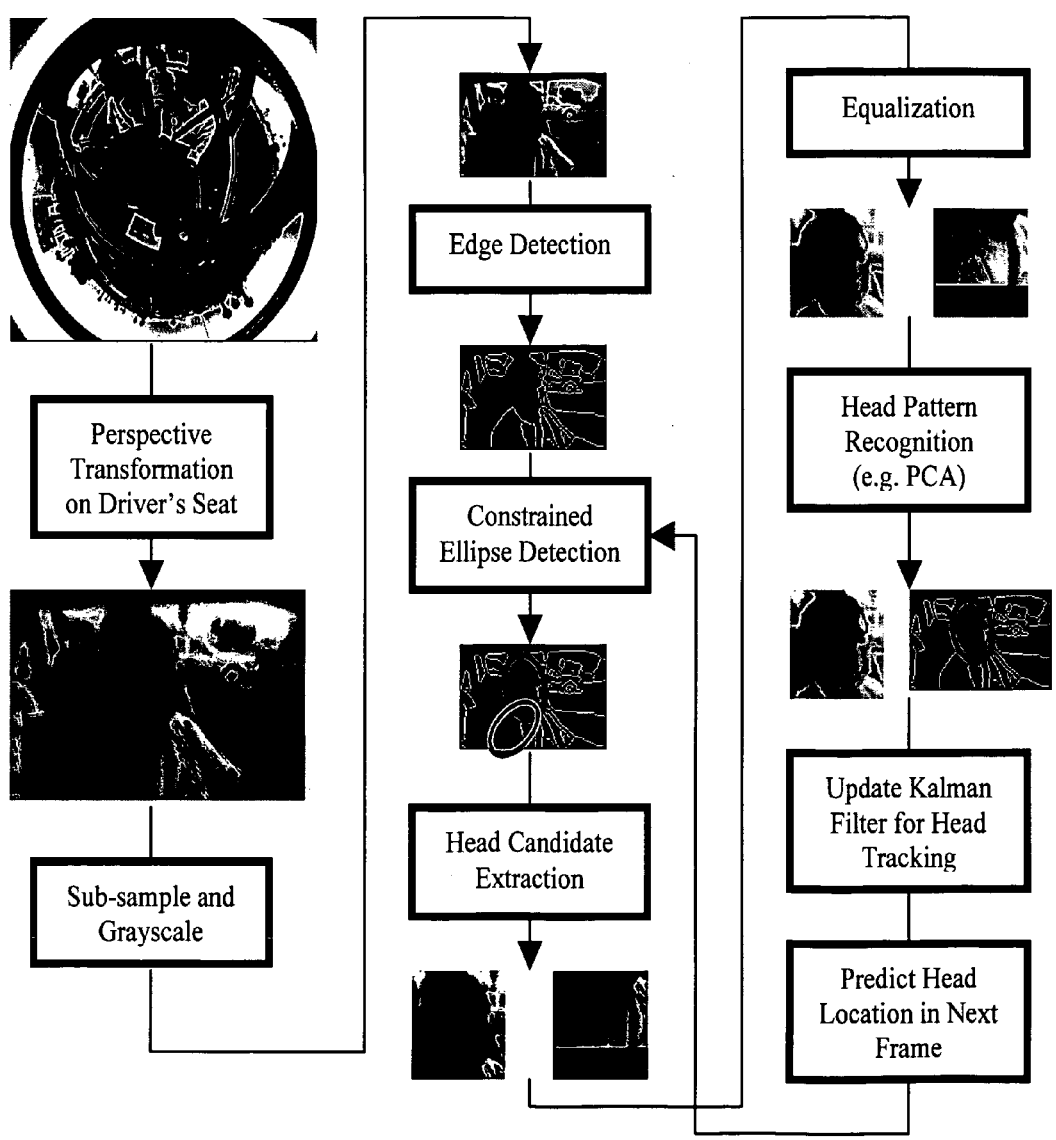
FIG. 11 shows one exemplary implementation of detection and tracking of head pose and a person's view.

FIG. 11 shows the operational flow for detecting and tracking the driver's head pose and orientation. First, a perspective view on the driver's seat area is generated. The driver image is sub-sampled and converted to gray scale for edge detection to achieve high speed ellipse detection. Randomized Hough transform (RHT) is used to detect elliptic head boundaries from the edge image by searching ellipses in the edge image with certain center, size, and orientation limitations on the ellipses to match general human heads. Equalized head candidates are then extracted from the ellipses by rotating the driver perspective image so that the corresponding ellipse aligns with a upright head pose in order to compensate head tilting. Selected ellipse candidates for the driver's head are compared to head patterns to reject false-positive heads. Principal component analysis (PCA) method can be used to classify head from non-head images. Then the ellipse location and direction in the driver image are used to update a set of Kalman filter to predict the ellipse location in next frame. This helps speeding up the ellipse detection by minimizing the area of edge image around the driver seat. It also helps rejecting false-positive head ellipses.

Figure 12A:
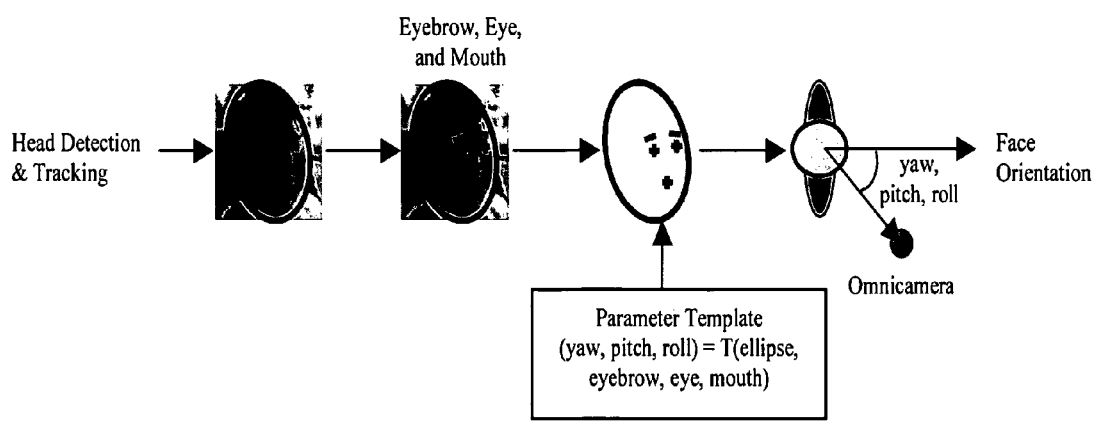
FIGS. 12A and 12B show two different processing methods for determining a person's face orientation and for generating the person's view.
Figure 12B:
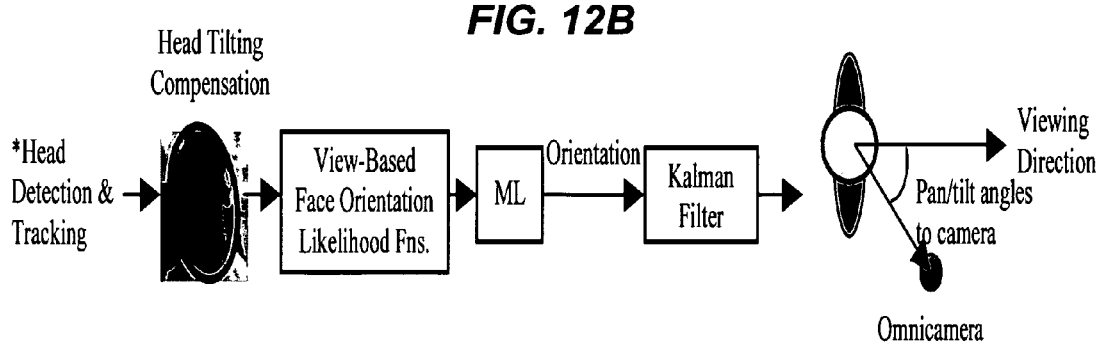

More specifically, in one implementation as shown in FIG. 12B, the driver's face image may be cropped by a square window fitting to the ellipse and the image may be scaled to a 64×64 image to reject non-face candidates by the distance from feature space (DFFS) method. Then the ellipse center, size, and orientation are used to update a set of constant velocity Kalman filters as follows:

$$\begin{bmatrix} x(k+1) \\ \dot{x}(k+1) \end{bmatrix} = \begin{bmatrix} I & T \cdot I \\ 0 & I \end{bmatrix} \begin{bmatrix} x(k) \\ \dot{x}(k) \end{bmatrix} + \begin{bmatrix} T^2 \cdot I/2 \\ T \cdot I \end{bmatrix} v(k) \quad (1)$$

$$y(k) = \begin{bmatrix} I & 0 \end{bmatrix} \begin{bmatrix} x(k) \\ \dot{x}(k) \end{bmatrix} + \omega(k)$$

where for ellipse center and size, state x and measurement y are 2 by 1 matrices and I is 2 by 2 identity matrix. For ellipse orientation, x, y, and I are 1 by 1. The parameter T is sampling interval or frame duration, e.g., 1/30 second. The covariance of measurement noise ω(k) is estimated from real-world data, and the covariance of random maneuver v(k) is empirically chosen by compromising between response time and sensitivity to noise. The states are used to interpolate detection gaps and predict the head position in the next frame. An ellipse search window is derived from the prediction and fed back to ellipse detection for the next frame. This window helps minimizing the area of ellipse searching and less extensive RHT can be used, therefore increases the accuracy and speed. It also helps filtering false-positive head ellipses.

The head tracking is initialized when an ellipse is detected and justified to be a head for some consecutive frames. Extensive RHT ellipse searching on the driver seat perspective view is used to find the first positive occurrence of head. Once driver's head is located and under tracking, the searching window is narrowed down and RHT uses less epochs to speed up the detection process. The track is terminated when no ellipse is detected and the predicted head location is classified as non-face for some consecutive frames.

Optionally, auxiliary illumination of the car interior, e.g., active illumination by using an illumination source, e.g., in the infrared spectral range by using infrared LEDs, may be used to decrease the range of fluctuation in the illumination and thus improve the head and face detection. Such auxiliary illumination can also facilitate the head/face detection under dark or nearly no light situations during the night and in tunnels.

After the head image is detected, head pose is estimated as follows. FIG. 12A illustrates an exemplary method for estimating the head pose. First, from the equalized head image, the facial features are detected by thresholding the image within the ellipse for the head. Next, the center coordinate of the ellipse and the facial features are then compared to a template to determine the yaw, pitch, and roll of the face. The template is a look-up table which corresponds to the locations of facial features to the face orientations. This determines the face orientation with respect to the video camera.

Alternatively, FIG. 12B shows another method for determining the face orientation in which PCA templates are generated on multiple face orientations of multiple people and are used. Driver's face image from head detection and tracking may be adjusted for head tilting. The image is then compared to view-based PCA templates to estimate the face orientation. First, a set of equalized training faces of multiple people with multiple horizontal face orientations are collected from the omnicam. The orientation in the training faces varies approximately from −60 to 60 degrees with 30 degree step size. Next, the PCA subspace is constructed from the correlation matrix of the training faces and all the training faces are projected into this subspace. Mean and covariance of the projections are estimated for each face orientation category and a Gaussian distribution is approximated for each category. The face orientations are categorized instead of the identities of people. In the estimation stage, the scaled and equalized face image in the face video is projected into the PCA subspace and generates likelihood values on these Gaussian distributions. The face orientation is thus estimated by maximum likelihood (ML). The estimated face orientation is then filtered by another Kalman filter as in Equation (1).

Figure 13:
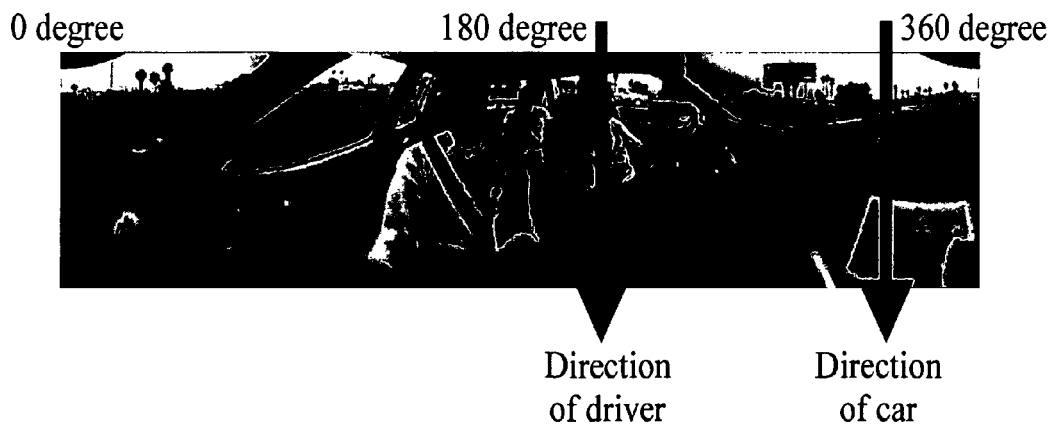
FIG. 13 illustrates the relative orientation of the omnidirectional camera in automobile video system based on the system in FIG. 11.
Figure 14:
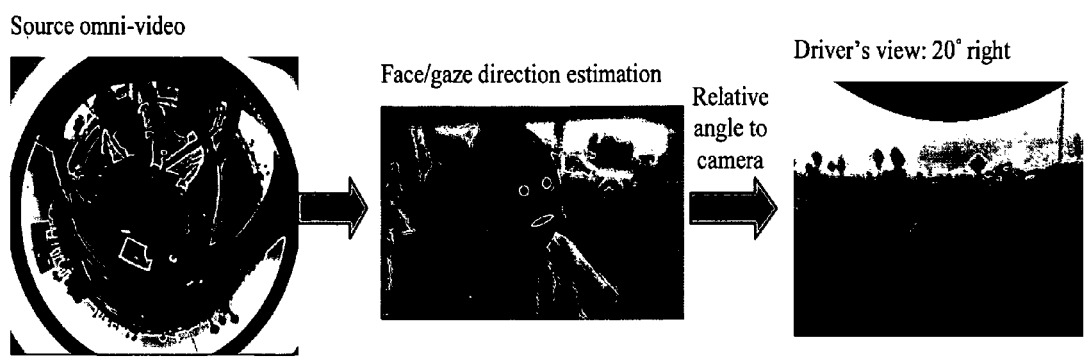
FIGS. 14 and 15 show additional examples of estimating face orientation and generating the person's view.

To synthesize the driver's view, the driver's face orientation with respect to the omnicamera direction is first determined according to one implementation. FIG. 13 shows that the direction of the omnicamera is the 0 degree direction. Since the driver's face orientation is given with respect to the omnicamera, the driver's face orientation with respect to 0-degree of omnicamera is given as (driver direction+driver's face orientation to omnicamera+180) degrees clockwise. The synthesized driver's view can be generated by adding the driver's eye gaze direction. FIG. 14 illustrates this method.

Figure 15:
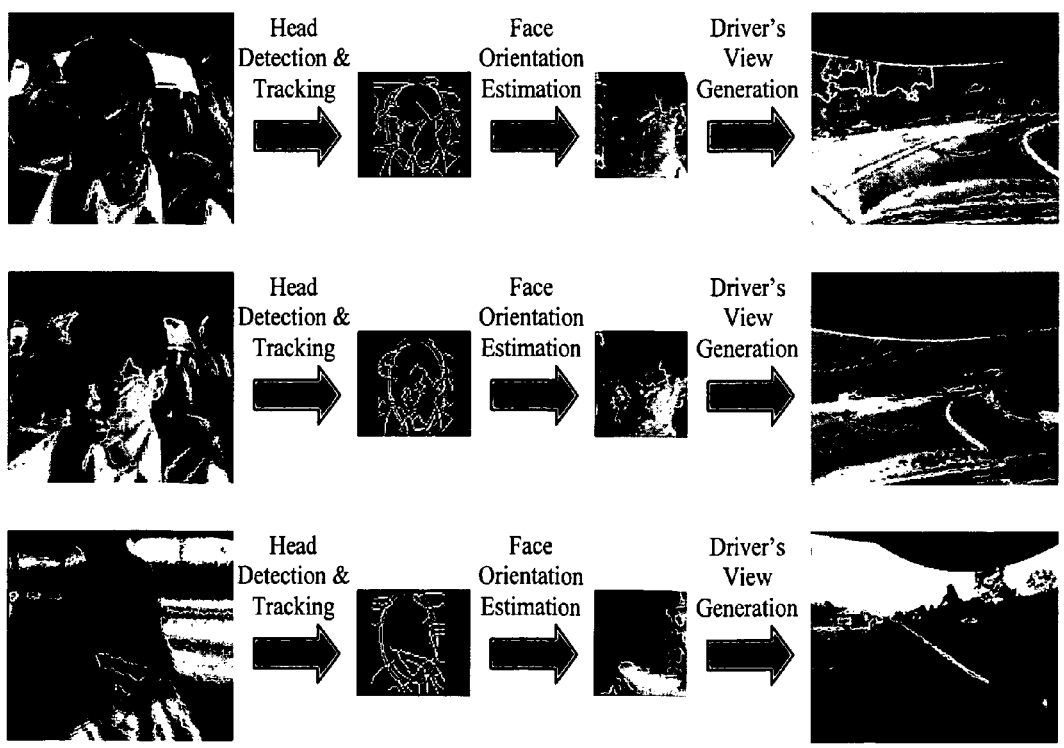

More specifically, the driver's viewing direction is computed from the filtered face orientation and driver's direction to the omnicam as in the following Equation (2):

$$\text{Viewing Direction} = (\text{Direction of Driver}) - 180° + (\text{Face Orientation}) \times K - (x_{ellipse} - x_{perseptive\ center}) \times (\text{degrees per pixel}) \quad (2)$$

where the facing direction is in terms of 0° of the omnicam and is the pan factor used to generate driver's perspective view from the omni video. In the above equations, the constant K approximates the ratio of gazing direction to facing direction for empirical driver gazing behavior. The last term in Equation (2) is used to take the exact location of head in the driver image into account, where $x_{ellipse}$ is the center of ellipse in x direction and $x_{perspective\ center}$ is the center of driver image in x direction. Thus driver's view video can be generated from the omnicam video with a fixed zooming factor to approximate human field of view. This aspect is further illustrated by examples in FIG. 15.

The performance of head tracking and face orientation estimation was evaluated using an extensive array of experimental data. One set of video clips was collected earlier with the omnicam set on a tripod sitting on the floor of the passenger seat. The clips were taken on different times in the day and on different road, weather, and traffic conditions. Head detection rates on the older and newer video clips are summarized in Table 1 and Table 2, respectively. In obtaining data in Table 1, the camera was placed in front of the passenger seat and approximately 45° side viewing the driver. For columns 3 to 5, no ellipse search window was fed back and full image search was used. When search window was applied, the detection rate of RHT ellipse search with less epochs was nearly as good as the rate of extensive RHT and the processing speed was much faster. After the filtering by the Kalman filter, the head was latched on by the detected ellipse for all frames. DFFS bound for rejecting non-face candidates in these experiments for Table 1 and Table 2 was 2500. In measuring data in Table 2, the camera was placed in front-left of the driver. When search window was applied, the detection rate of RHT ellipse search with less epochs was even better than the rate of extensive RHT and the processing speed was much faster. After Kalman filter, the head was latched on by the detected ellipse for all frames.

TABLE 1

Head detection rates before Kalman filtering of 2 video clips

| Clip | Frames | Rough RHT, 1 Epoch | Rough RHT, 2 Epochs | Extensive RHT, 10 Epochs | RHT + Feedback, 10→1 Epochs | RHT + Feedback, 10→2 Epochs |
|---|---|---|---|---|---|---|
| #1 | 200 | 33% | 58% | 69% | 63% | 67% |
| #2 | 75 | 29% | 45% | 75% | 68% | 67% |
| Avg. | — | 32% | 52% | 71% | 64% | 67% |

TABLE 2

Head detection rates before Kalman filtering of 3 video clips

| Clip | Frames | Rough RHT, 1 Epoch | Rough RHT, 2 Epochs | Extensive RHT, 10 Epochs | RHT + Feedback, 10→1 Epochs | RHT + Feedback, 10→2 Epochs |
|------|--------|--------------------|---------------------|--------------------------|-----------------------------|-----------------------------|
| #3   | 15     | 53%                | 67%                 | 84%                      | 80%                         | 91%                         |
| #4   | 15     | 40%                | 42%                 | 71%                      | 62%                         | 71%                         |
| #5   | 15     | 58%                | 76%                 | 80%                      | 76%                         | 98%                         |
| Avg. | —      | 50%                | 61%                 | 79%                      | 73%                         | 87%                         |

The RHT head detection rate is the ratio of frames where the head ellipse is detected to the total number of frames in the video clip. When rough RHT is applied without feedback of ellipse search window, head detection rate is relatively low. The rate improves if extensive RHT ellipse search was used on each frame. However the processing speed is slow.

After the feedback loop is closed, the extensive RHT search was applied to only the first frame and the rough RHT was applied if the head is detected. As a result, the head detection rate was much improved to be as good as or even better than the extensive RHT, and the processing speed was as fast as rough RHT. After KF tracking and interpolation, no frame was missed even in some tough situations like face occlusion, sharp uneven illumination, and turned-away face.

Table 3 shows the false positive rates under different DFFS settings. The head detection used closed-loop RHT ellipse search with 10->2 epochs. One video clip of empty driver seat was repeatedly tested under different values of DFFS bound.

TABLE 3

False positive rate of head detection before Kalman filtering.

| DFFS Bound | False Positive Rate |
|------------|---------------------|
| 2500       | 9%                  |
| 2000       | 7%                  |

A comparison of Table 1 and Table 2 suggests that the camera placement should be closer to the driver. In this case the driver's face is more clear and the edge map of driver's head is closer to ellipse. Active infrared illumination would be helpful to increase head detection rate since it makes the driver image more clear and smoothes uneven illuminations, weather, tunnel, and night situations. Also, there is a trade-off between head detection rate and speed for RHT based ellipse detection. Higher head detection rate would be desirable because the dynamics of head motion can be quickly reflected in head tracking and face orientation estimation. However, it would require more epochs and sacrifice real-time requirement. It poses a need for less complicated ellipse detection algorithms. To further speedup the process, multiple processors or DSP hardware may be used. The tasks of head detection and tracking in FIG. 11 can be partitioned to view generation, edge detection, ellipse detection, and PCA-based face classification. Each part or a group of modules can be assigned to a specific processor.

TABLE 4

Mid-to-long term accuracy of face orientation estimation

| Clip | Frames | Approximate Ground Truth | Error before KF Mean | Std. Dev. | Error after KF Mean | Std. Dev. | Note |
|------|--------|--------------------------|----------------------|-----------|---------------------|-----------|------|
| #1   | 200    | 35°~23°~35°              | −1°                  | 8°        | −1°                 | 7°        |      |
| #2   | 75     | 35°                      | −19°                 | 27°       | −18°                | 24°       | Sharp uneven illumination |
| #3   | 70     | 35°                      | 1°                   | 7°        | 0°                  | 8°        |      |
| #4   | 30     | 35°                      | 16°                  | 28°       | −15°                | 16°       | Face occluded |

TABLE 5

Short term accuracy of face orientation estimation

| Clip | Frames | Approximate Ground Truth | Error before KF Mean | Std. Dev. | Error after KF Mean | Std. Dev. | Note |
|------|--------|--------------------------|----------------------|-----------|---------------------|-----------|------|
| #5   | 15     | −25°                     | 0°                   | 19°       | 4°                  | 7°        |      |
| #6   | 15     | −25°                     | −3°                  | 8°        | −2°                 | 3°        |      |
| #7   | 15     | 0°~70°                   | −45°                 | 32°       | −50°                | 17°       | Rapid face turning |

Table 4 and Table 5 show the accuracies of face orientation estimation on different video clips of different length. In measuring data in Table 4, the camera was placed in front of the passenger seat and approximately 45° side viewing the driver. The face video was cropped by a closed-loop head detection and tracking with RHT of 10→2 epochs. The error before Kalman filter is the error of the output of ML face orientation estimation and the error after Kalman filter is the error after Kalman filter. In measuring data in Table 5, the camera was placed in front-left of the driver and the face video was cropped by a closed-loop head detection and tracking with RHT of 10→2 epochs.

The error of face orientation estimation on each frame is compared to the approximate ground truth value estimated by human. Both the short term and long term clips exhibit comparable accuracies. However for some problematic situations like face occlusion, sharp uneven illumination, and turned-away face, the face orientation estimation shows a big error deviation. For the face occlusion, the face orientation may be estimated by interpolation along the frames using Kalman filter. The turned-away face problem could be alleviated by placing the omni-camera near the front of the driver so it captures all possible orientations of the face. For uneven illumination situation, PCA templates are prone to produce higher error rates. Other subspace feature analysis like LDA or ICA templates would be helpful in this case.

Eye-gaze direction estimation may be desirable for providing an accurate driving view. In Equation (2), a rough estimate of driver's gazing direction can be estimated from driver's face orientation. Rectilinear camera set on the dash board may be needed because the omnicam resolution is not sufficient for the pupil. A commercial system, facelab, of Seeing Machines is an example for this purpose. Also, active infrared illumination on driver's face could be useful to estimate eye-gaze direction by bright pupil effect.

To improve the performance of face orientation, the follow process may be applied. A continuous density hidden Markov model (HMM) with N=13 states can be constructed to represent face orientations from approximately −90 to 90 degrees with 15 degree step size. The observation probability of the j-th states $b_j(O)$ can be modeled by a mixture of the five Gaussian distributions in PCA subspace for each training face orientation category as previously mentioned, or more generally M Gaussian mixtures, $$b_j(O) = \sum_{m=1}^{M} c_{jm} N(O, \mu_{jm}, U_{jm}) \quad (3)$$

where O is the projection vector of the adjusted face image in feature subspace, $c_{jm}$, $1 \leq j \leq N$ is the mixture coefficient which sums up 1 on m, and $\mu_{jm}$ and $U_{jm}$ are the mean and covariance of the Gaussian density, respectively.

Figure 16:
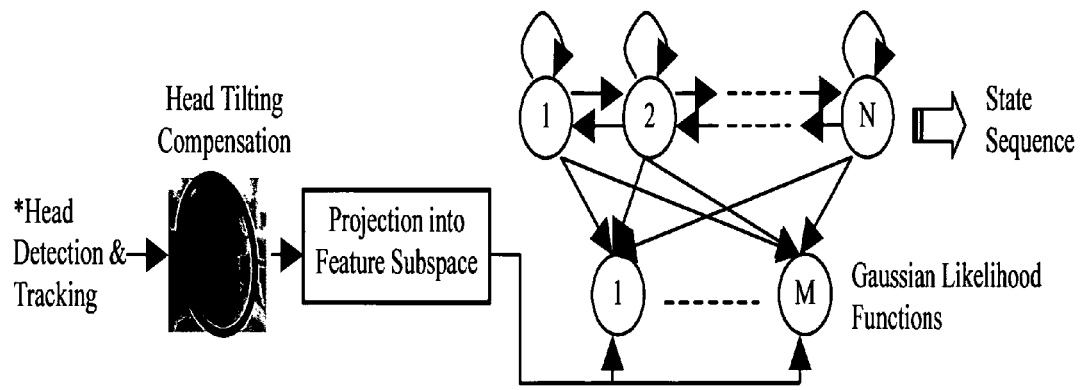
FIG. 16 illustrates a face orientation estimation by the continuous density hidden Markov Model (HMM).

FIG. 16 illustrates this modified face orientation estimation by the continuous density HMM. Face video is projected into feature subspace and generates M Gaussian likelihood values. Those values are observed by each state and a state sequence can be estimated to describe the face orientation sequence in the video in some optimal sense.

The state sequence q(k) for a given a driver's face video can be estimated by maximum a posteriori (MAP) estimation in real-time as follows:

$$q(k) = \arg\max_{1 \leq j \leq N} b_j(O(k)) P(q(k) = S_j \mid q(k-1)). \quad (4)$$

Alternatively, it can be optimally estimated by Viterbi algorithm with some delay caused by sequence framming.

The initial probability p and state transition probability A of the hidden Markov chain as well as the parameters in equation (3) are estimated by the EM algorithm. Video clips of driver's face should be collected and projected into feature subspace to carry out the HMM distribution parameter estimations. This approach to face orientation estimation may likely outperform other methods in that it is a delayed decision approach and it does not, before Kalman filtering, discard the useful likelihood information as in the maximum likelihood decision. The estimated state sequence represents the face orientation movement of the driver. Continuous state HMM such as Kalman filter with likelihood functions as observations is also of interest to develop for higher resolution description of the facing movement. The face orientation motions can be further utilized to estimate driver's attentive and psychological status by a hierarchical layer of estimators such as Bayesian nets.

The above described techniques for head detection and tracking, and determination of face orientation may be used to process video signals other than unwrapped DTV video. For example, the face orientation may be estimated from other type of cameras, e.g., rectilinear camera, plus other processing such as gaze direction. The face pose and gaze direction from other cameras can also be used to generate the instantaneous view of the target person from the omnidirectional video in a system having at least one omnidirectional video camera and another different camera such as a rectilinear video camera.

Other applications for the face pose estimation may be possible. For example, an omnidirectional camera or omnidirectional vision sensor (ODVS) may be deployed in the middle of a casino table to monitor the faces of the players. By analyzing the face pose of the players, the system can sense facial signs between some players if they look at each other frequently. Additional modules may be used to analyze eye gaze and body gesture. The body gesture analysis may be based on multiple views or on voxel reconstruction from multiple cameras so that the gesture can be estimated in 2D, 2.5D, 3D depending on the configurations of camera setup. In 2D estimation, gesture in one view is compared to selected gesture patterns such as sitting or yawning. In 2.5D, multiple views from one direction are combined to derive depth information for stereo vision in order to recognize the gesture. In 3D, multiple views of the human body from different directions are combined to carve a virtual 3D volume in computer for the shape of the human body in order to recognize the gesture. Other applications of face orientation analysis may include driving the direction of the DTV or another PTZ camera at a remote site for video conference, human-machine interfaces, e.g., driving the mouse cursor by face orientation, and generating the view of a surgeon for remote surgery or medical training purposes.

The following sections now describe another optional digital processing module for the digital processor: face recognition based on video streams. In one implementation, the face recognition method combines the subspace feature analysis like PCA and time series modeling like Hidden Markov Models (HMMs). Subspace feature analysis is first applied to the face images in a video segment of fixed number of frames. Majority decision rule is then applied to single-frame recognition results in the video segment. Discrete HMM (DHMM) is also applied to the single-frame recognition sequences. Continuous density HMM (CDHMM) is applied directly to the sequence of feature vectors for maximum likelihood (ML) decision on the video segment in a delayed decision manner. Then these streaming face recognition (SFR) decision rules are compared to determine their overall correct percentages (OCPs).

This video-based face recognition may be used in surveillance applications, e.g., ATMs, airports, police patrol that need to identify people in either fixed location or in natural situations which roughly frontal view of faces is available. Other applications of this technique include smart appliances, smart cars, and smart environments where face recognition is needed. Other application are certainly possible.

As described below, the present video-based face recognition schemes, at a minimum, combine subspace feature analysis, e.g., PCA (Principle Component Analysis) or ICA (Independent Component Analysis), and time series modeling, e.g., Hidden Markov Models (HMMs). Features or recognition results of the facial frames in a temporal video sequence are accumulated and classified either by the majority decision rule or by the HMM maximum likelihood (ML) rules. Therefore, the present video-based face recognition schemes utilize accumulation of visual information over time in a video stream to improve the performance by reducing the errors. In comparison, many single-frame based face recognition algorithms are not sufficiently robust under various practical imaging conditions, such as free human motion, facial expression, uneven illumination, different backgrounds, sensor noise, and many other human and machine factors.

Figure 17:
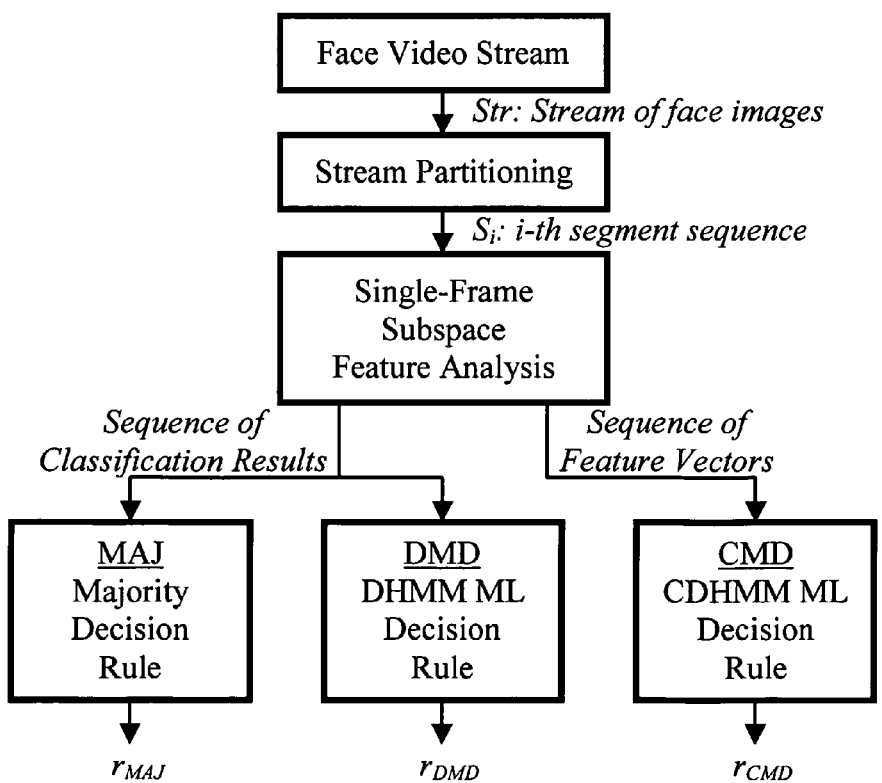
FIG. 17 shows one implementation of the video-based face recognition.

FIG. 17 shows one implementation of the video-based face recognition. First, a face video stream is obtained. This face video stream may be obtained from the unwarped rectilinear video stream produced by the DTV module of the digital processor as described above. Alternatively, the face video stream may be obtained from other sources such as a rectilinear video camera. Assume this face image stream is represented by $Str=\{f_1, f_2, f_3, \ldots\}$. Next, the face image stream is partitioned into overlapping or non-overlapping segment sequences of fixed length L, $S_i=\{f_1, f_2, \ldots, f_L\}_i$, $S_i \subset Str$, i=1,2,3, . . . . It is assumed that the faces in Str belong to M individuals I=$\{1,2, \ldots, M\}$. A single-frame subspace feature analysis is then applied to the partitioned segment sequences to generate sequence of classification results and sequence of feature vectors. Subsequently, both majority decision rule and DHMM ML decision rule are applied to the sequence of classification results to produce the face recognition results while the CDHMM ML decision rule is applied to the sequence of feature vectors.

In the following sections, the PCA-type single-frame subspace feature analysis is described as an example. The collected segment sequences are classified by the majority decision rule and the HMM maximum likelihood (ML) rules.

The single-frame feature analysis described here is an alternation to the standard PCA or eigenface method. One feature of the present method is that the eigenvector basis is generated by the correlation matrix of training faces instead of the covariance matrix. Another feature is that the projection vector of a test face image on the eigenvector basis is normalized. In this manner the single-frame face recognition can be less subject to illumination changes, because by (1) the norms of projection vectors in the eigenvector subspace are proportional to the intensity of face images and by (2) the intensity change of face images due to illumination change is normalized. Various tests were performed and confirmed this.

Given D training face vectors $t_1, t_2, \ldots, t_D$ of dimension n of the M individuals, the n dimensional eigenvectors $u_1, u_2, \ldots, u_n$ can be derived by singular value decomposition on $T=[t_1\ t_2\ \ldots\ t_D]$. The feature subspace $\Im$ is spanned by the first D<n orthonormal eigenvectors $u_1, u_2, \ldots, u_D$.

For a test face image f, its feature vector in $\Im$ is $x=[x_1\ x_2\ \ldots\ x_D]^T$, where $x_i=\langle f,u_i \rangle = f^T u_i$, i=1,2, . . . ,D. Then the feature vector is normalized as $\hat{x}=x/\|x\|$. This projection-normalization procedure is denoted as $\hat{x}=Projn(f)$. At this stage, single-frame face recognition is carried out by nearest-neighborhood as $$r_{SF} = ID\left(\operatorname*{argmin}_k \|\hat{x} - \hat{t}_k\|\right),$$

where $\hat{t}_k=Projn(t_k)$, k=1,2, . . . , D, and ID(k) returns r if $t_k$ is a training face image of individual r, r∈I. This single-frame recognition is denoted as $r_{SF}=SF(f)$.

The input to the majority decision rule (MAJ) is a segment sequence of single-frame recognition results $R_i=\{r_{SF1}, r_{SF2}, \ldots, r_{SFL}\}_i=SF(S_i)$, where $r_{SF\ j}\in I$, j=1,2, . . . ,L. Then the SFR result of the MAJ rule is the most frequent $r_{SF}$ in $R_i$. We denote the MAJ procedure as $r_{MAJ}=MAJ(S_i)$.

For Discrete HMM ML decision rule (DMD), the discrete HMM (DHMM) is used to model the temporal recognition sequences $R_i=SF(S_i)$. Given several training sequences $R_i=SF(S_i)$, i=1,2,3, . . . for each individual m, m∈I, Baum-Welch re-estimation is applied to train a discrete HMM $\lambda_m=(\pi,A,B)_m$ of N states and M observation symbols, where $\pi_{1 \times N}$ are the initial state distributions of the Markov chain, $A_{N \times N}$ are the state transition probabilities, and $B_{N \times M}$ are the discrete observation densities for each state. For a given test sequence $R_{test}=SF(S_{test})$, the DMD rule classifies the sequence by ML using the forward procedure as the follows:

$$r_{DMD} = \operatorname*{argmax}_{m \in I} P(R_{test} | \lambda_m). \qquad (5)$$

The above DMD rule is expressed as $r_{DMD}=DMD(S_{test})$.

Continuous density HMM (CDHMM) is used in the continuous density HMM ML decision rule (CMD). For each individual m, m∈I, a CDHMM $\lambda_m=(\pi,A,C,\mu,U)_m$ of N states and G Gaussian mixtures per state is trained using expectation maximization Procedure on the training sequences:

$$\hat{X}_i=\{\hat{x}_1, \hat{x}_2, \ldots, \hat{x}_L\}_i=Projn(S_i), \text{ where } i=1,2,3, \ldots$$

In $\lambda_m$, $\pi_{1 \times N}$ and $A_{N \times N}$ are the same as DHMM case, while $C_{N \times G}$ are the Gaussian mixture coefficients for each state. In contrast to DHMM, Gaussian mixture approximates the multi-dimensional continuous observation density of $\hat{x}$ for each state j, $1 \leq j \leq N$, by $$b_j(\hat{x}) = \sum_{g=1}^{G} c_{jg} N(\hat{x}, \mu_{jg}, U_{jg}) \qquad (6)$$

where $\Sigma_{g=1}^{G} c_{jg}=1$ are the non-negative mixture coefficients of $C_{N \times G}$, N(.) is Gaussian density, and $\mu_{jg}$ and $U_{jg}$ are mean vector and covariance matrix, respectively. Note that we pick the first d components of $\hat{x}$, $d \leq D$ for $b_j(\hat{x}_k)$, $k=1,2,\ldots,L$, because the first d principal components are more prominent and it saves computation. Then given a test feature vector sequence $\hat{X}_{test} = \text{Projn}(S_{test})$, the CMD rule classifies it by ML using the forward procedure as follows:

$$r_{CMD} = \arg\max_{m \in I} P(\hat{X}_{test}|\lambda_m) \quad (7)$$

The CMD rule is a delayed decision in that the single-frame recognition is skipped and the feature details are retained until the final decision (7). The decision procedure (7) is denoted as $r_{CMD} = \text{CMD}(S_{test})$.

Various tests were performed to evaluate the performance of the above video-based face recognition. The three SFR schemes, MAJ, DMD, and CMD, were compared experimentally with the PCA-type single-frame face recognition scheme on in an omnidirectional video array intelligent room testbed. In this testbed, five omnidirectional video cameras were used to track people in real-time and a nearby omni-camera in the video array was chosen to zoom into the face. We collected 5 training and 4 testing face videos for each of the 5 people at different room locations and backgrounds on different omni-cameras. The patterns of face turning and expression were inhomogeneous between the training and testing sets. The testbed system then logged at 15 fps for each person 4360 to 5890 training frames and 1880 to 3980 testing frames of single-frame face recognition $r_{SF}$'s and feature vector $\hat{x}$'s. This same set of data was used to compare the SFR schemes offline.

Figure 18:
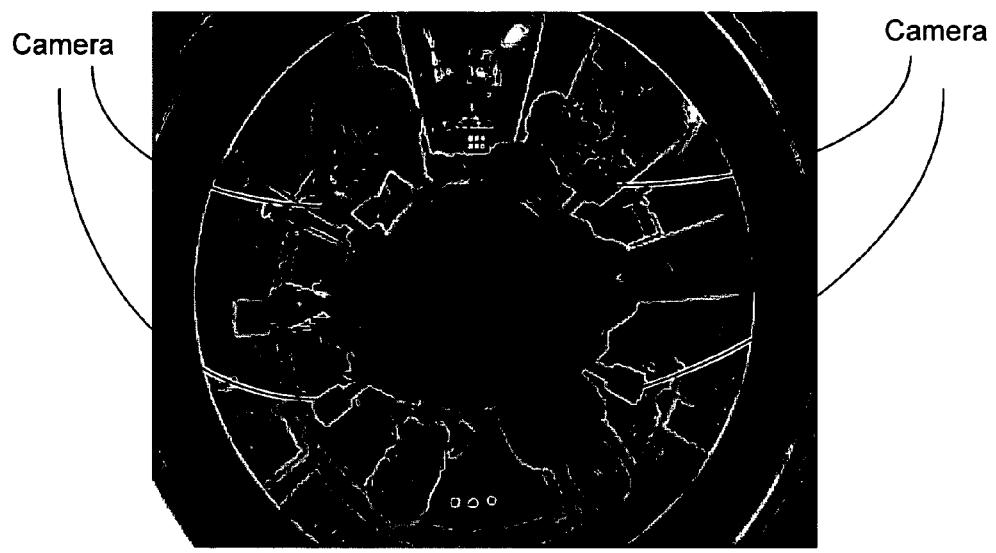
FIG. 18 shows a warped video image from one camera.

FIG. 18 shows a warped video image from one camera. The DTV module may be used to generate perspective video of a human face from this omnidirectional video.

Figure 19A:
FIG. 19A shows six examples of the face images in the training and testing video streams which are perspective views generated from the omni videos.
Figure 19B:
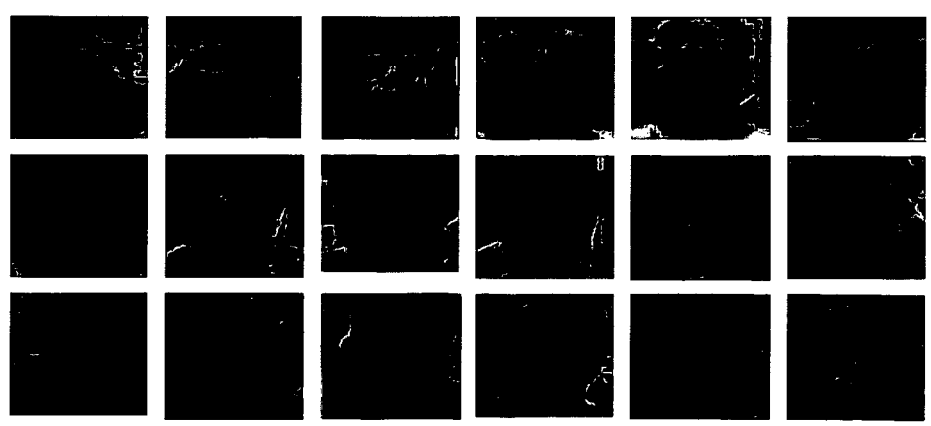
FIG. 19B shows face images that were automatically extracted by a testbed system.

FIG. 19A shows six examples of the face images in the training and testing video streams which are perspective views generated from the omni videos. FIG. 19B shows face images that were automatically extracted by the testbed system. The images show various face angles, sizes, expressions, backgrounds, and other perturbations that SFR needs to deal with.

The performance index used is the overall correct percentage (OCP) which is the average of the success recognition percentages of the 5 people on one set of settings of a SFR scheme. The experiments were carried out to: (1) find the optimum settings for the SFR schemes, and (2) compare the optimum OCPs of the SFR schemes. The data streams were partitioned into non-overlapping segment sequences of L=49 frames. The size of the face videos was. The dimension D of single-frame PCA-type feature subspace was 135.

Figure 20:
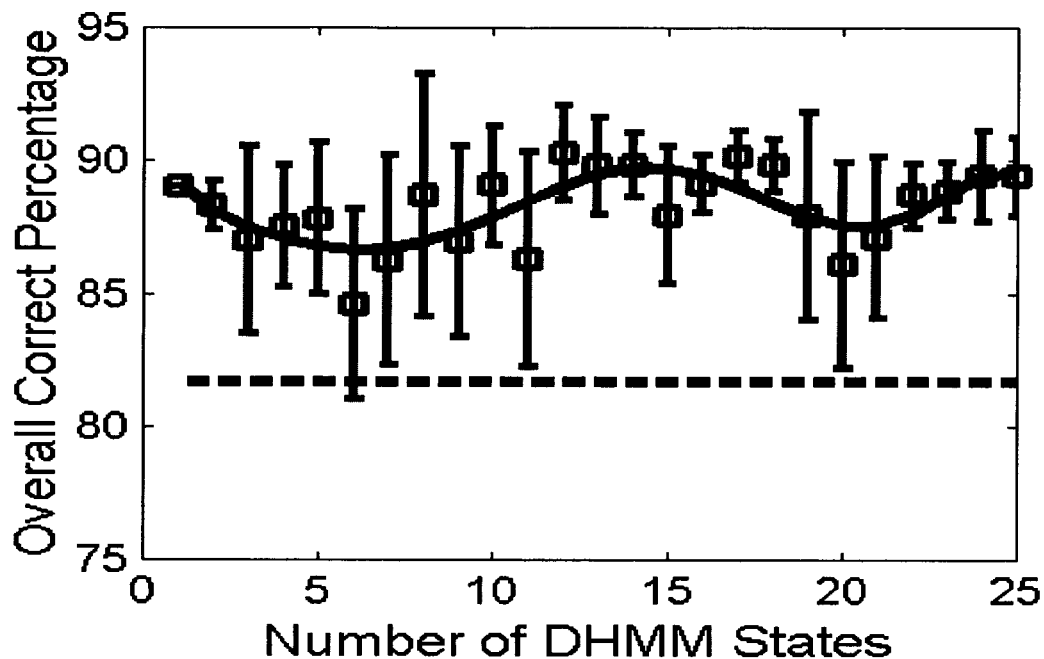
FIGS. 20, 21, 22, and 23 show results of face recognition based on the implementation in FIG. 17.

The MAJ and DMD rules are compared in FIG. 20. The error bars show mean and standard deviation of the experimental OCP on four trials. Solid curve is a polynomial fitting of the mean values. Dotted line is the OCP of the MAJ rule (81.7%). For each N, four trials of the discrete HMM training were performed to find the mean and standard deviation of DMD OCP. From the 7th order polynomial fitting, the best OCP is 89.7% when N=14, and the worst OCP is 86.6% when N=6. The MAJ OCP is always 81.7%.

Figure 21:
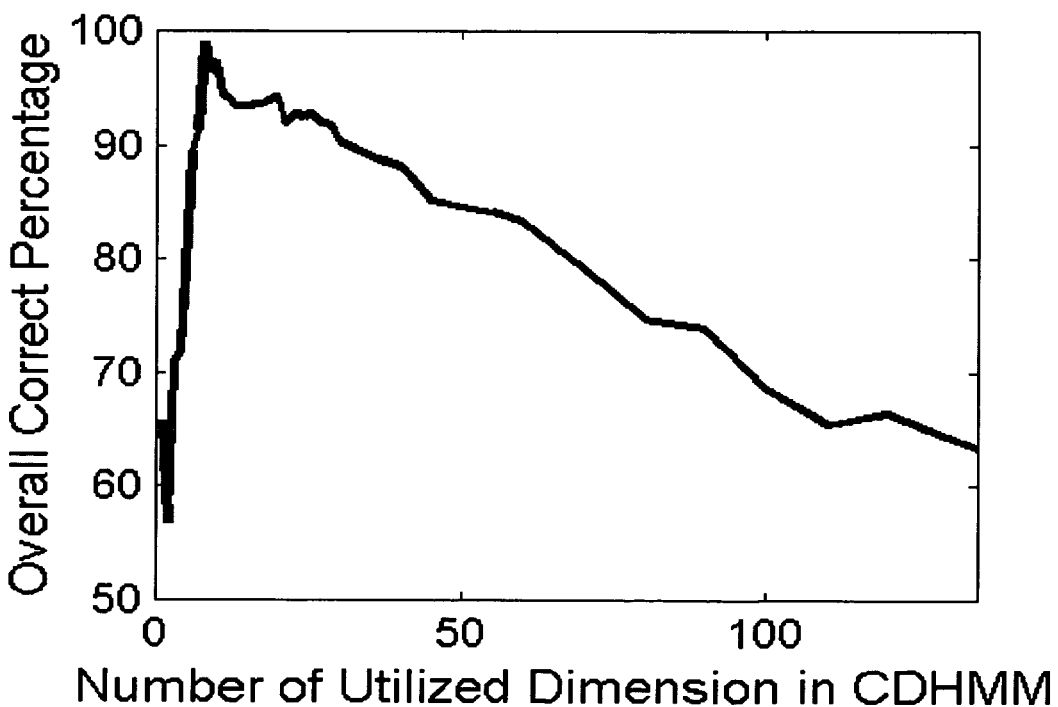

For CMD rule, we search for the optimum setting starting from N=G=d=1. FIG. 21 shows the CMD OCP on d. The full dimension D of the PCA feature vectors is 135. Both the numbers of CDHMM state N and of Gaussian mixture G are 1. The peak OCP is 99.0% when d=8.

TABLE 6

Comparison of the optimum OCPs of the single-frame face recognition and the SFR rules

| Decision Rules | | Optimum OCP | Note |
|---|---|---|---|
| Single-Frame FR | | 75.9% | |
| SFR | MAJ | 81.7% | |
| | DMD | 89.7% | N = 14 |
| | CMD | 99.0% | N = 1, G = 1, d = 8 |

Figure 22A:
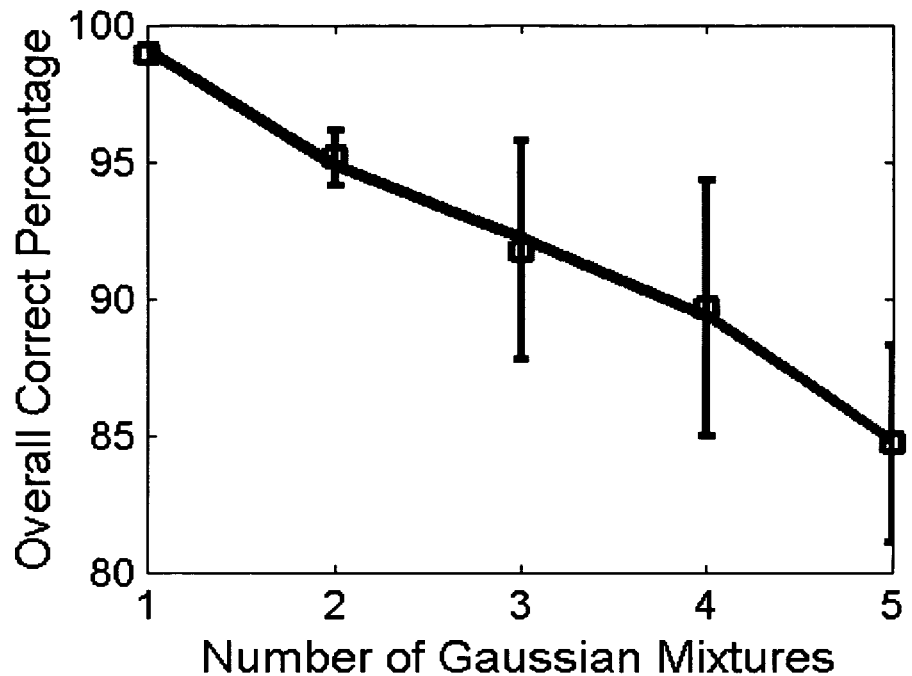
Figure 22B:
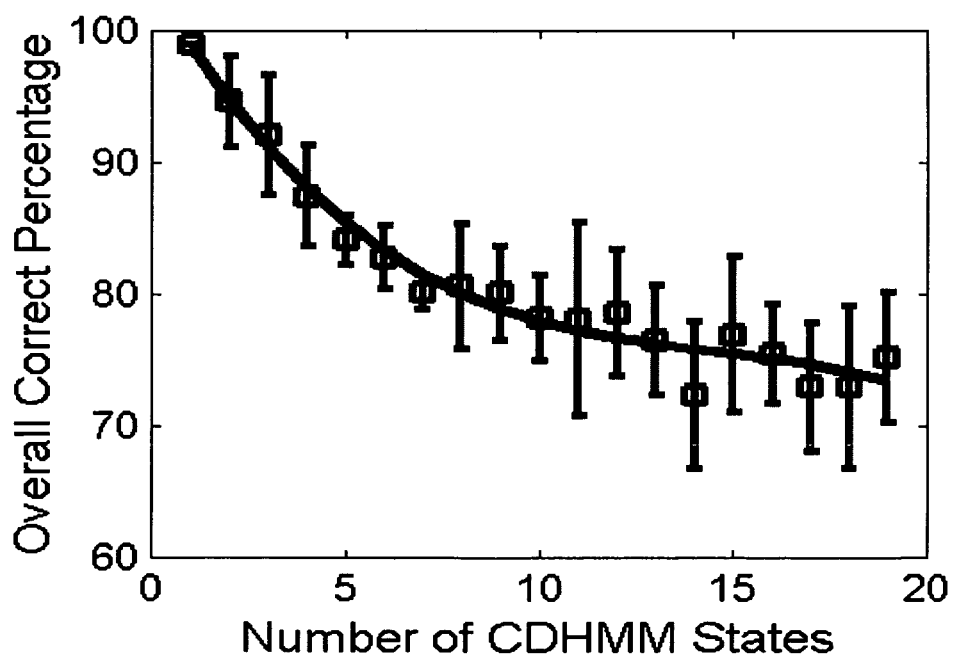

FIGS. 22A and 22B show the the CMD OCP decays monotonically with G and N when away from N=G=1 and d=8. FIG. 22A shows the OCP of the CMD rule on the number of Gaussian mixtures G with N=1. FIG. 22B shows the OCP of the CMD rule on the number of CDHMM states N with G=1. In both cases, d=8. The solid curves in the plots are polynomial fitting of the experimental mean values. Four trials of training were performed to find the means and standard deviations for each setting. Thus the best OCPs of the MAJ, DMD, and CMD rules can be compared to the single-frame face recognition, as summarized in Table 6.

In view of the above measurements, the video-based face recognition in FIG. 17 is further examined in the follow sections.

We first examine the CMD rule. When N=G=1, CMD has the optimum OCP. In this case the likelihood computation in (3) becomes $$P(\hat{X}|\lambda) = \pi_i b_i(\hat{x}_1) a_{ij} b_j(\hat{x}_2) \ldots a_{pq} b_q(\hat{x}_L) \quad (8)$$
$$= b(\hat{x}_1) b(\hat{x}_2) \ldots b(\hat{x}_L)$$

since $\pi_i$'s and $a_{ij}$'s are all 1 for N=1 and the Gaussian mixture in Equation (6) becomes $b(\hat{x}) = N(\hat{x},\mu,U)$ for G=1. Then the training of the CDHMM $\lambda$ is reduced to the fitting of a multi-dimensional Gaussian density to the training feature points in the feature subspace. For a testing sequence $\hat{X} = \{\hat{x}_1, \hat{x}_2, \ldots, \hat{x}_L\}$, Equation (7) becomes a distribution matching of the points $\hat{x}_1, \hat{x}_2, \ldots, \hat{x}_L$ in the feature subspace.

Figure 23:
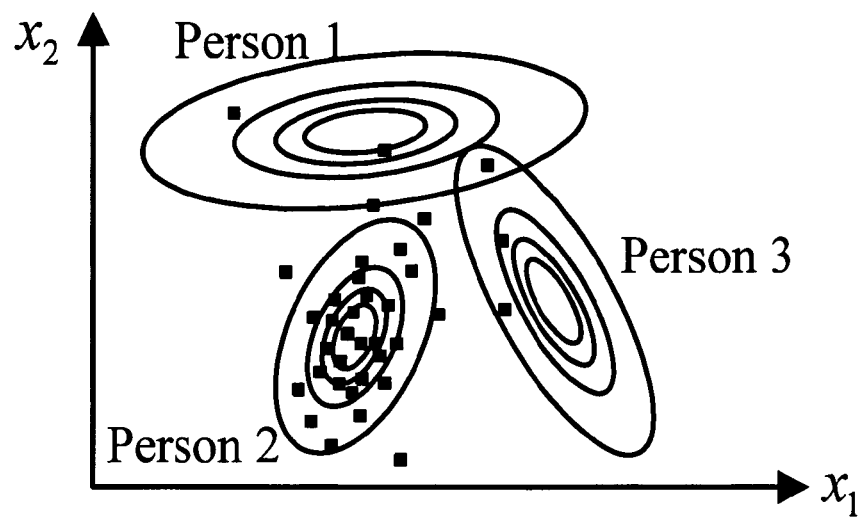

FIG. 23 illustrates the geometric interpretation of the ML computation as a distribution matching in the feature subspace. The ellipses are the Gaussian density functions of the clusters, and the dots are the feature vectors in a test sequence $\hat{X}$. Symbols $x_1$ and $x_2$ are the bases of feature subspace. Out of N=G=1, as G increases, the Gaussian mixture in Equation (6) is no more ellipsoidal and the chance to overlap with others increases. Hence the OCP decays in FIGS. 22A and 22B. Also as N increases, the OCP drops because of the temporal inhomogeneity between the training and testing sequences.

With respect to the data in FIG. 21, since the feature subspace is spanned by the ordered principle components of the training face images, faces are represented better and better from d=1 to d=8. After d=8, noisy information is better represented, so the OCP drops gradually. For single-frame face recognition, a face is classified to a training face by nearest neighborhood in feature subspace. Hence its OCP is lowest because it models ellipsoids by spheres and a single face can be driven to other clusters by noises. On the other hand, a collection of faces smoothes the noise issues. Thus the OCP of the MAJ rule is better. The DMD rule further models the temporal patterns of the sequence by Markov chain. Thus as in FIG. 20, there is resonance between the temporal patterns of the training and testing sequences. This implies that the resonance pattern in FIG. 20 would change with the temporal patterns of the training and testing sequences. As a result, the performance of the decision rules is CMD>DMD>MAJ>Single-frame face recognition as in Table 6.

In addition, as the sequence length L increases, the OCP of the SFR schemes can be improved by better smoothing and better Gaussian density approximation. However, it would add more delay to get the SFR results. Overlapped sequences could improve the delay between SFR results, but the effect on OCP needs further research. On complexity of the SFR schemes, MAJ is clearly the lowest. DMD is higher due to discrete HMM training and likelihood computations. CMD is the highest since it further involves multi-dimensional Gaussian density, yet the reward is a 99% OCP. The current computer power should be enough for real-time processing on all of them. The real-time implementation and re-evaluation on the setting issues can be further performed. Also facial expression recognition can be done by analyzing the HMM state transition using Viterbi algorithm. However, PCA feature analysis might not be sufficient to analyze facial expressions. ICA-based subspace feature analysis would be a good alternative.

In certain applications, it is desirable to track persons or objects in real time within an area under video surveillance. As well recognized in the computer vision community, such tracking, especially tracking of people, using video sensors in real-time presents various technical challenges in the development of accurate, reliable, robust, and practical algorithms and systems. The following sections describe implementations of a real-time tracking technique which may be implemented as part of the digital processing of the video systems of this application. These implementations of real-time trackers may be used, for example, to track one or multiple persons or objects in an indoor environment and to provide an "intelligent" machine-vision environment for maintaining an awareness of all dynamic events and activities. We will use tracking of persons as an example and it should be understood that tracking of objects may be similarly implemented.

Figure 24:
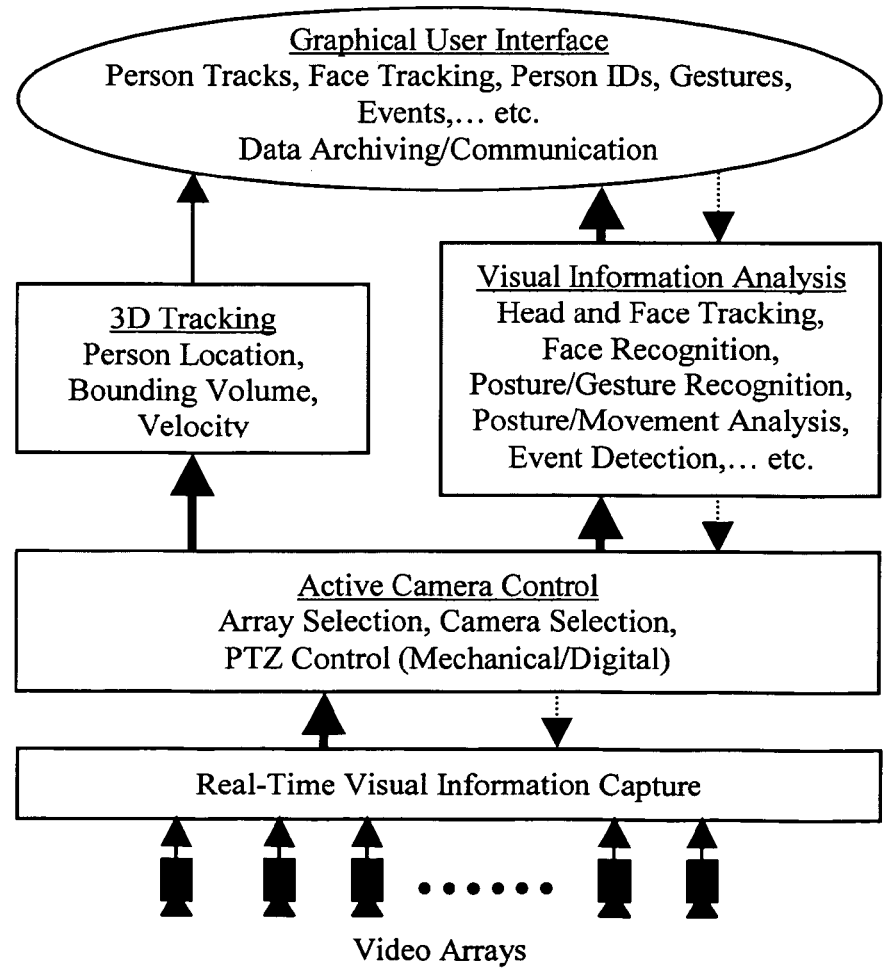
FIG. 24 shows one example of an intelligent room system.

FIG. 24 shows one implementation of processing modules of an intelligent room system. Similar to other processing techniques described here, the modules in FIG. 24 may be implemented as software modules to be executed by a computer. The system may include multiple video cameras located at different locations to acquire visual information broadly by wide coverage from different camera locations and angles, and attentively by zooming into details of a person or object. Different from a system with a single video camera where any video image captured at a given moment is 2 dimensional, this use of multiple video cameras allows for capturing video images of the same target from different camera locations and viewing angles to provide 3 dimensional or nearly 3 dimensional imaging information. The data of the 3D imaging may be used to extract information for certain processing functions of an object or person under surveillance that would not be available from 2D imaging data from a single camera, e.g., in detection and tracking of a person's head and determination of face orientation, and face recognition.

In FIG. 24, the stream video signals from the video cameras are first captured by a real-time visual information capture module. Next, an active camera control module is used to provide controls for the selection of camera array, selection of the video from a camera, the pan, tilt, and zoom controls of a selected camera, and other control functions. The PTZ controls of a selected camera may be digitally controlled by using, e.g., the DTV module described above, without changing the settings in the corresponding video camera. Alternatively, the PTZ controls may be executed by feedback control signals to the corresponding video camera to mechanically adjust the PTZ of the camera. The mechanical approach typically provides higher resolution video but also requires better calibration, slower performance, and limited number of simultaneous focuses of attention. The fully electronic approach via digital control is free from these limitations but compromises on image resolution.

Two primary processing modules in FIG. 24 are the 3D tracking of people or objects, and the module for visual information analysis. The visual information analysis may include head and face tracking, face recognition, posture and gesture recognition, posture and movement analysis, event detection, and other processing functions. The 3D tacking module may include functions such as the detection of person location, and measurements of bounding volume and velocity. As indicated in FIG. 24, the visual information analysis may receive output from the 3D tracking module to perform its analysis because accurate and robust 3D tracking can boost system performance on generating close-up videos of human heads and faces and other body parts for face recognition and posture and movement analysis.

FIG. 24 further shows a graphical user interface module to allow for various user controls and adjustments, such as the person tacks, face tracking, person IDs, gestures, events provided by the 3D tracking, visual information analysis, and active camera control modules. The interface module may also include controls for data archiving and communications.

The indoor space can be visually captured by multiple cameras in an outside-in-coverage configuration where an array of multiple rectilinear cameras are placed in the peripheral area of the room such as the walls and ceilings. Alternatively, an inside-out-coverage configuration may be used by placing an array of cameras to capture a wide area panoramic images from some no-obtrusive vantage points within the environment. An array of omnidirectional cameras with a 360-degree view may be used to provide an effective inside-out-coverage configuration.

Figure 25:
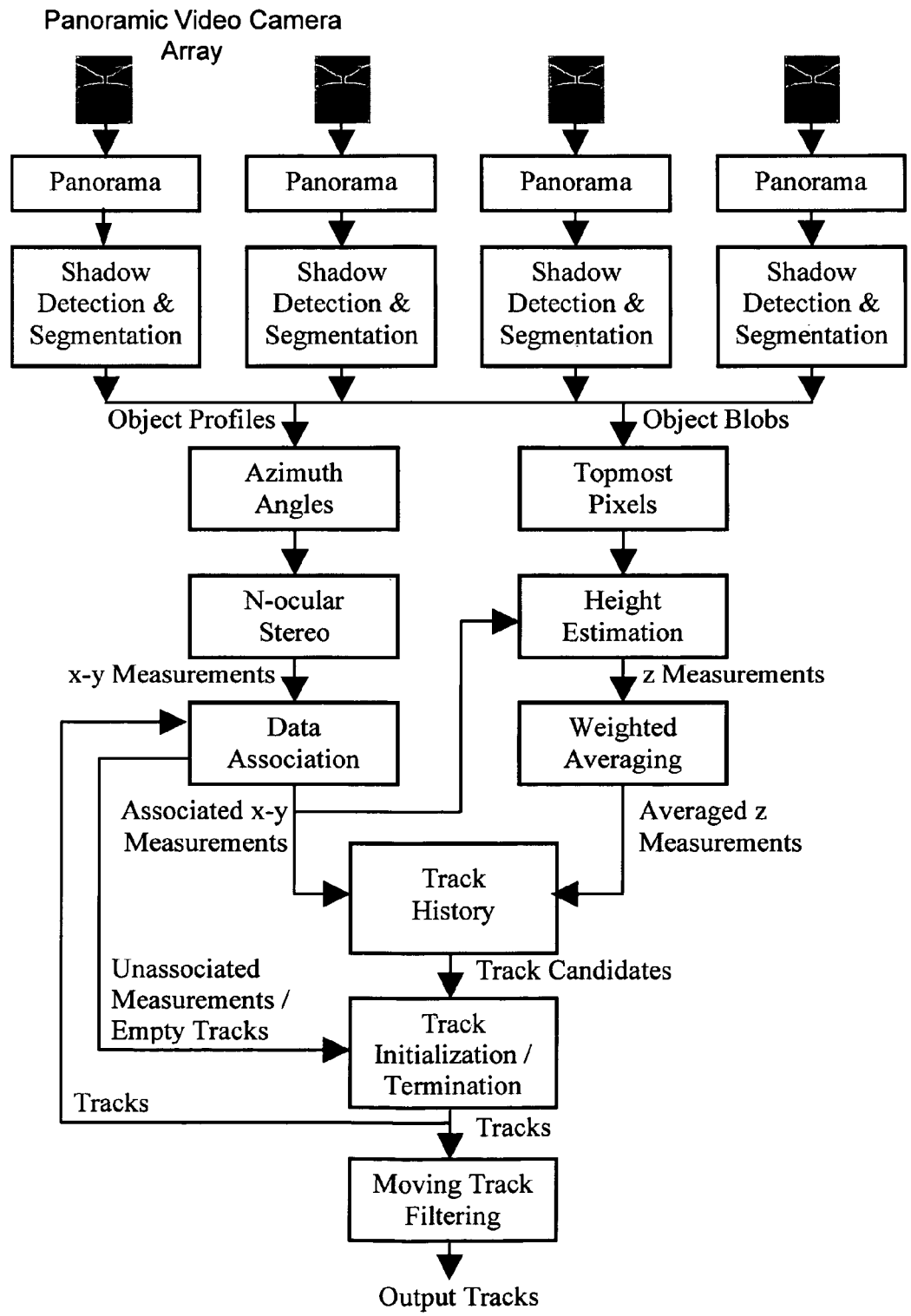
FIG. 25 show one example of a 3D tracking system.

FIG. 25 shows one exemplary implementation of a 3D tracker for tacking persons in real time by using multiple panoramic video cameras in an inside-out-coverage configuration. One application of this 3D tracker is for the 3D tacking module in the system in FIG. 24. Certainly, this 3D tracker may be used in other applications, e.g., operating alone for tracking people and objects or operating in combination with other functions.

The video cameras in FIG. 25 may use omnidirectional vision sensors (ODVSs) based on the optical configuration shown in FIG. 7. Each ODVS provides the maximum (360°) coverage. Such an ODVS array may be used in the system in FIG. 25 to provide an effective 3D tracker of human movements and track their faces. Under this specific video camera array configuration, the system in FIG. 25 is referred to as Omnidirectional video array tracker (O-VAT). The 3D person tracker having four ODVSs is illustrated in FIG. 25 as an example. Each ODVS is calibrated in advance on the location and height of the ODVS optical center, horizon on the ODVS panorama, azimuth direction, and internal parameters. The ODVSs are set upright. Location and height of the optical center are measured physically with respect to a preset origin in the room. To calibrate horizon on the ODVS panorama, first the ODVS height is marked on the wall and the center of ODVS image is then trimmed so that the marks align onto a row of the panorama. This is necessary for an accurate human height estimation. Azimuth direction α of the ODVS is calculated by the relative location of a known object in the image with respect to the ODVS as $$\alpha = \tan^{-1}\left(\frac{o_y - c_y}{o_x - c_x}\right) - \tan^{-1}\left(\frac{y_1 - y_0}{x_1 - x_0}\right)$$

where $(c_x, c_y)$ is the center of ODVS image, $(o_x, o_y)$ is the image coordinate of the object, $(x_0, y_0)$ is the horizontal location of the mirror focus, and $(x_1, y_1)$ is the horizontal location of the object. Multiple object points may be used to improve the accuracy of α, and the horizontal tracking accuracy. Internal parameters, i.e., the geometry of the hyperbolic mirror, camera focal length, and CCD pixel geometry, are supplied by the manufacturer of the camera.

Figure 26:
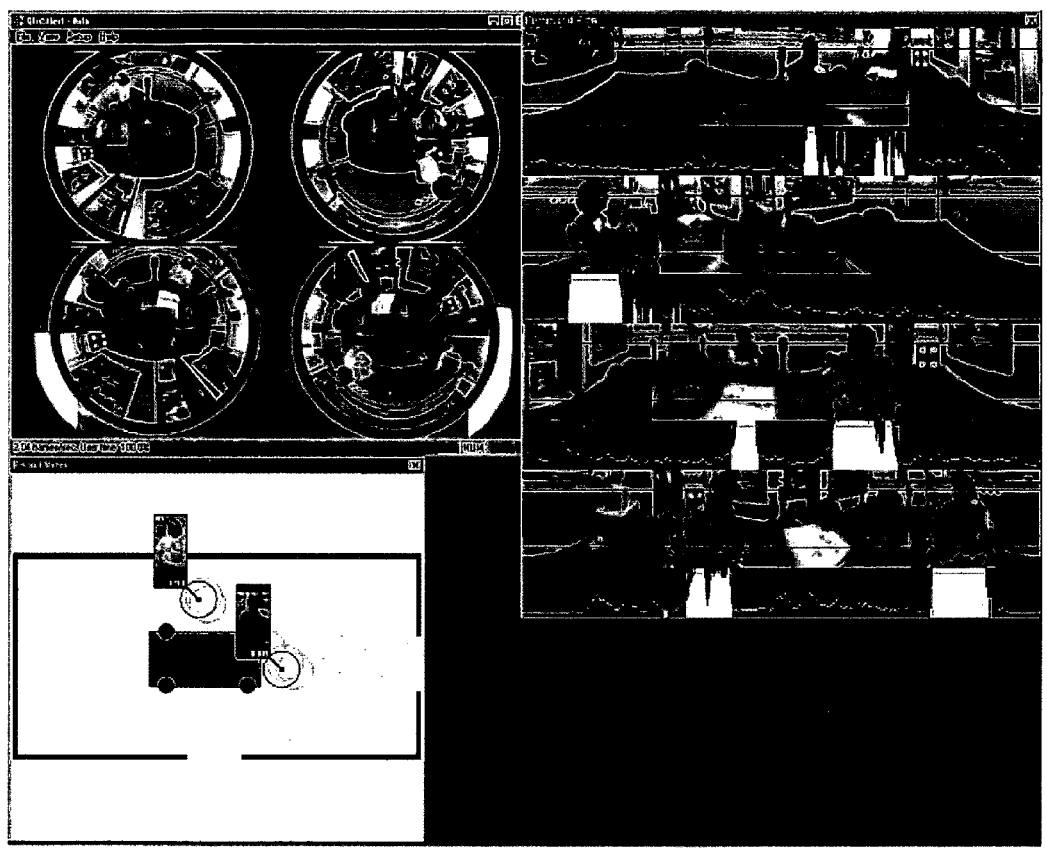
FIG. 26 illustrates the layout and exemplary video images of the ODVS array within a test room.

FIG. 26 illustrates the layout and exemplary video images of the ODVS array within a test room of 6.6 m×3.3 m×2.9 m where the ODVS network is mounted 1.2 m above ground on the corners of a table with a dimension of 1.3 m×0.9 m. The upper-left window shows the four source ODVS videos. The upper-right window shows the unwarped panoramic videos with human detection processing. The 1D profiles below panoramas are for detecting the azimuth range of humans and the human blobs in the panoramas are for shadow detection. The lower-left window is the floor plan with the estimated human locations and heights in centimeters.

For human detection, each ODVS video is first unwrapped into a panoramic view. Segmentation is performed on the panoramas. As shown in FIG. 26, first an 1D profile is formed by accumulating the pixel differences between the current frame and the pre-acquired background frame in each column of the panorama. Mean and variance of each background pixel are also acquired so that shadow detection can be performed on the pixels of the current frame. Since each panoramic column corresponds to an azimuth angle, the azimuth range of a human can be detected from the 1D profile for each ODVS. Knowing the locations of the four ODVSs, the x-y horizontal location of the person can be determined by a sophisticated triangulation algorithm called N-ocular stereo. See, e.g., T. Sogo, H. Ishiguro, and M. M. Trivedi, "N-Ocular Stereo for Real-Time Human Tracking," in Panoramic Vision, edited by R. Benosman and S. B. Kang, Springer-Verlag, pp. 359-375 (2001) and "Real-Time Target Localization and Tracking by N-Ocular Stereo," Proc. IEEE Workshop on Omnidirectional Vision, pp. 153-160 (June 2000). With the increasing of N, the number of ODVS in the array, N-ocular is able to localize humans more precisely and reject more ghost locations. The measured x-y locations are then associated to the nearest human track registered by the O-VAT.

After the x-y measurement is available, height z of the person can be estimated. First the horizontal distance of the person to an ODVS is computed. Then on the panorama, the topmost pixel of the person's blob is detected. Thus height of person $H_{person}$ can be estimated by similar triangle as $$\frac{(y_{blob} - y_{horizon})H_{pixel}}{R_{panorama}} = \frac{H_{person} - H_{upper\ focus}}{d_{person\ to\ ODVS}}$$

where $y_{blob}$ is the topmost pixel of person's blob, $y_{horizon}$ is the horizon on the panorama, $H_{pixel}$ is the pixel height of panorama, $R_{panorama}$ is the radius of cylindrical screen of the panorama, $H_{upper\ focus}$ is the physical height of the upper focus of ODVS hyperboloid mirror, and $d_{pperson\ to\ ODVS}$ is the estimated horizontal distance between the person and ODVS. The final estimate of person's height is a weighted sum of the estimates from the four ODVSs. The weight is inverse proportional to the distance between the person and the ODVS. Thus the x-y-z location is measured and associated to a registered human track.

On track registration, a new track is initialized if there exists an unassociated measurement. If no new measurements are associated to it for a period, the track is terminated. A human video of the track is displayed if the track has been registered for several hundred milliseconds, as shown in FIG. 26. The estimated human height is also displayed in centimeters. The 3D output track of O-VAT is a moving average of the x-y-z measurements in the past 0.5 seconds.

Referring back to FIG. 24, the illustrated integrated system has two modes of operation: 3-D tracking of people (mode 1), and mode 2 of tracking of the head and face of one or more persons under the 3D tracking in mode 1. Results of mode 1 are used to select the "best view" camera to capture the inputs for the mode 2 operation. As an example, the following describes details of accomplishing these two steps in an integrated manner using a network of four omnidirectional video sensors.

The ODVS array can be extended to perform real-time head and face tracking as a dynamic system operation. The implementation of head and face tracking is to latch on the face of a walking or sitting person by an electronic PTZ perspective view generated from a full frame (e.g., 640×480) ODVS video. Given the location of person's head from the 3D O-VAT, the most nearby ODVS in the array is chosen to generate the perspective view by the active camera selection (ACS). If the person moves, ACS switches to a suitable ODVS that facing the person according to the walking direction.

The perspective view is generated from the ODVS image by the ODVS geometry and is a rectilinear screen whose viewing point is at the upper focus of the hyperboloid mirror of the ODVS. FIG. 8 and the corresponding textual description for FIG. 8 provide detailed explanation on a method to generate the perspective view.

A series of experimental evaluations were conducted on the performance of the integrated ODVS array tracking system. The experiments were performed for two possible scenarios for evaluation of the head and face tracking module: (i) people walking in the room, and (ii) people sitting around a conference table.

The experimental setup was the same as the experiments of the 3D O-VAT. The purpose of head and face tracking is to latch on the face of a walking or sitting person by a perspective view (e.g., 176×144 pixels) generated from a full frame (e.g., 640×480 pixels) ODVS video. Head and face tracking is regarded successful if the human head or face is fully kept within the perspective view by the system. When the person is walking, the head or face of the person can be at least 92% tracked by the dynamically generated perspective view when the person is walking slower than approximately 1.6 m/sec in our testbed. The instances when the system did not fully catch upon the person's head or face were when the active ODVS was being handed over to another one by hardware switching. The hardware switching delay is about 0.5 second. If the person walks faster than 1.6 m/sec, the tracking system would have problem catching upon the head or face due to a delay between the moving-average tracking output and the instantaneous human position. When the person is sitting, the face is 100% latched on no matter of facing angles. These two cases are summarized in Table 7.

TABLE 7

PERFORMANCE OF INTEGRATED
HEAD AND FACE TRACKING

| Category | Latch-on percentage |
|---|---|
| Walking people | ≥92% if walking slower than 1.6 m/sec. Otherwise drop-off |
| Sitting people | 100% |

After a face is being tracked, the face can be identified using a robust streaming face recognition algorithm as described in the prior sections of this application. Instead of using single frame images, it boosts recognition rate up to 99% by classifying sequences of face images by Gaussian mixture model and maximum likelihood decision rule. The face video can also be analyzed for facial expressions. Thus the integrated system is more intelligent for applications like video conference and visual surveillance.

In the above sections, four different digital processing modules for the digital processor in each video processing device are described: the DTV module, the module for detecting and tracking a person's head pose and orientation, the module for video-based face recognition, and the module for 3D tracking in real time. The digital processor for an application may include one or more of such modules.

Figure 27:
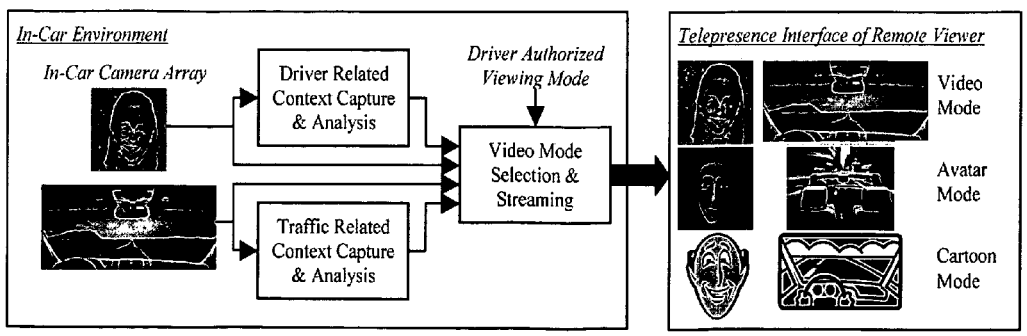
FIG. 27 shows one example of a driver assistance system based on the digital processing in FIG. 11.

For example, the intelligent room system shown in FIG. 24 may be implemented by integrating all four modules together. As another example, a driver safety system for a motor vehicle may include the DTV module and the module for detecting and tracking a person's head pose and orientation. One such system is the aforementioned VCAT system as illustrated in FIG. 27 where a remote caller receives the streaming video from the camera in the vehicle and actively control a conversation with the driver to assist the driver operating the vehicle to improve the cell phone safety. This system derives visual context information on the driver and the traffic conditions. These cues could be used to alert the driver, e.g., to be used by the remote caller to change the conversational style according to events in or around the car. Visual cues about the driver and traffic conditions can be conveyed to the remote caller in raw video, in avatar and animated scene, and in cartoon formats. Thus the system provides a telepresence experience to the remote caller like a passenger sitting in the car. It also estimates the attentive load of the driver and mitigates the conversation by audio-visual warnings. In this twofold effect, cell phone usage would be safer by avoiding the driver from being distracted. As yet another example, the DTV module and the face recognition may be implemented in a security video monitoring system to monitor a selected area for presence of predetermined persons, such as wanted criminals. As one may appreciate, applications for such digital processing modules are versatile.

Figure 28:
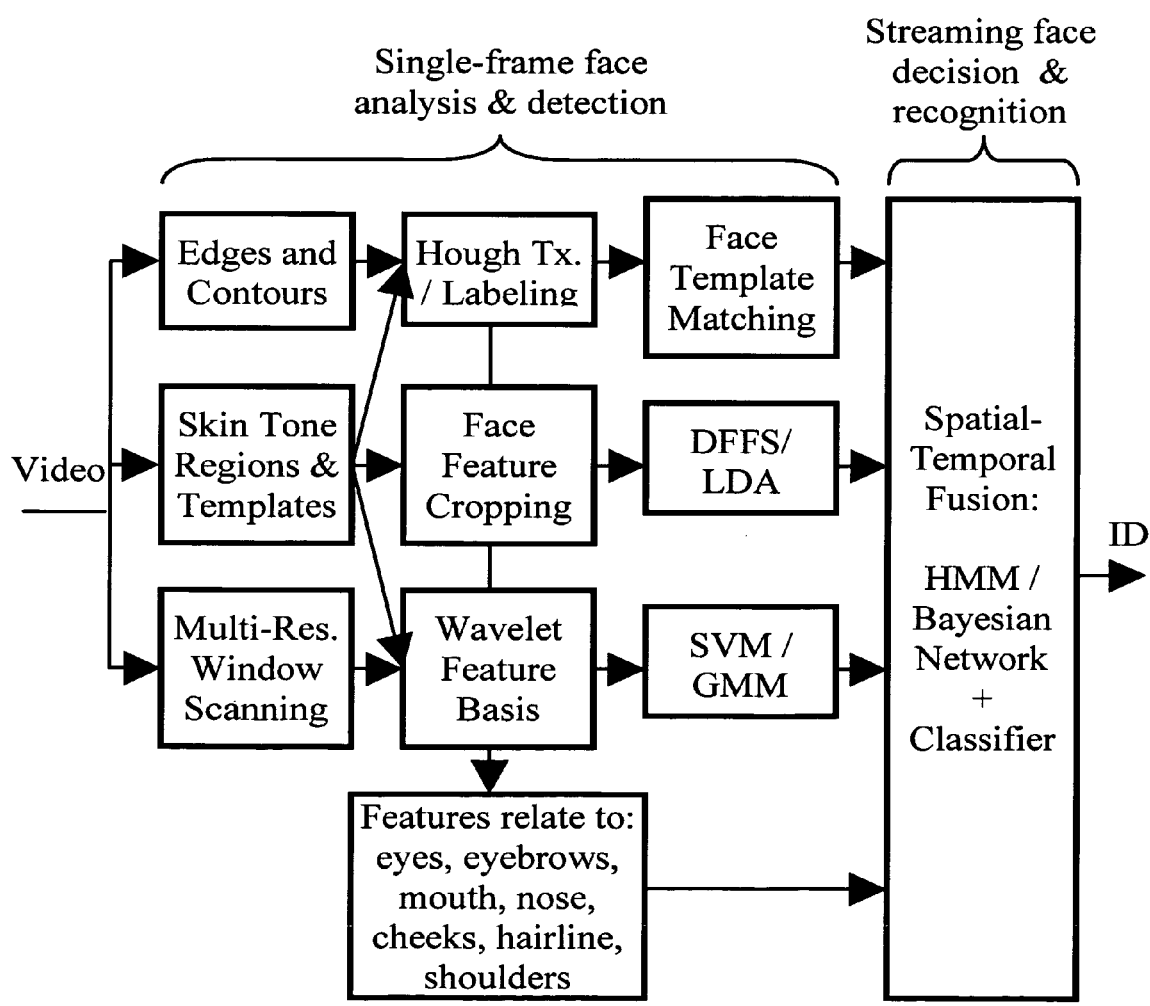
FIG. 28 illustrates a processing module to provide streaming face detection and correlation.

FIG. 28 illustrates a processing module to provide streaming face detection and correlation. This module first performs face analysis and detection based on the single frame and then performs the streaming face detection and recognition by processing the output of the single-frame processing. Prior to the face recognition, faces in the video should be detected reliably. For single-frame features, three different processing paths are used to achieve a high reliability. The first processing path uses edges and contours to detect heads, face regions, and facial features like cheeks, eyes, mouth, and hairline. Skin tone template match information may be imported from a second processing path and be compared to the edges to enhance the detection and help in rejecting false positives. Template matching is then applied to detect the faces with a likelihood score. The second processing path is a view-based approach using skin tone regions and templates. Distance-from-face-space (DFFS) is an eigenface template matching method for face detection and recognition. Linear discriminant analysis (LDA) is a good alternative to eigenface since it has better discrimination capability. The third processing path is based on gray-scale wavelet features where a window scanning through the test image extracts wavelet features by the wavelet transform. Again, the skin tone template match information may be imported from the second processing path and be compared to the edges to enhance the detection. The feature vectors are then classified by a support vector machine (SVM) or a Gaussian mixture model (GMM) which are trained for classifying face and non-face by bootstrap technique. For spatial-temporal fusion, single-frame scores and features for each frame in the video are partitioned into segments. An accumulated likelihood of a segment is computed using HMM or Bayesian net. Face detection can be reflected by the state trajectory and the face identity can be decided by maximum likelihood rules.

For face correlation, each detected face in the video is compared to the image set of a person to find the correlation of the detected face and the image set. The detected faces may also correlate among themselves to find the duplicate faces.

Figure 29:
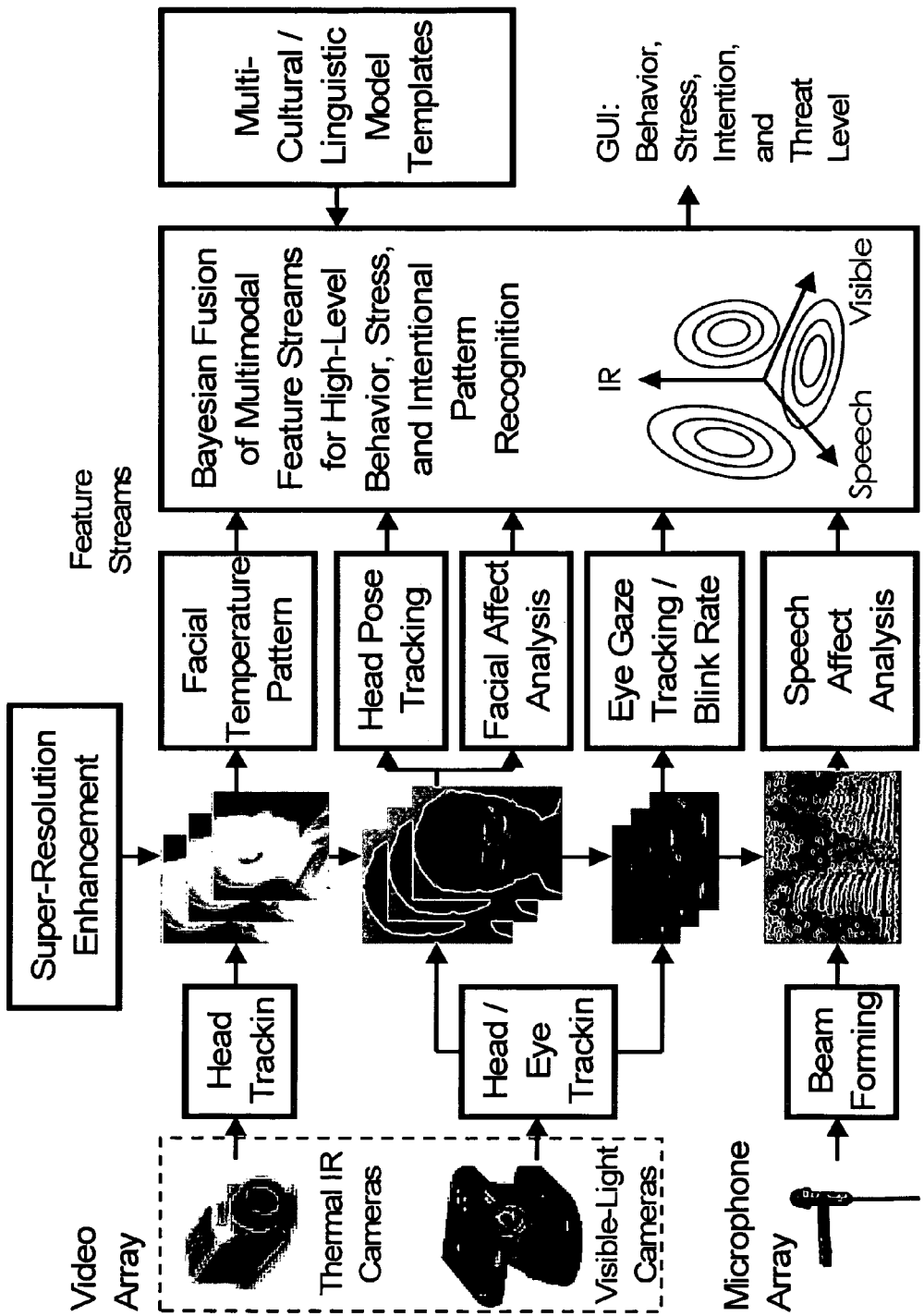
FIG. 29 shows a system for analyzing multimodal human behavior, stress and intent pattern.

FIG. 29 shows a system for analyzing multimodal human behavior, stress and intent pattern. A video camera array having multiple video cameras is used to capture various visual images of a person. For example, multiple color and monotonic ODVSs or thermo IR cameras can be used to track people in environments of natural or artificial illuminations or totally dark. This system can then drive a high-resolution rectilinear pan-tilt thermo IR camera to track the person's face and analyze the pattern of the facial temperature. Meanwhile, the tracker may also drive a visible-light pan-tilt-zoom camera to track the face to analyze the head pose and eye gaze direction and blink rate. The head pose tracking may be implemented as described in FIGS. 11, 12A and 12B. The facial affect analysis may be carried by first detecting certain selected facial landmarks (eyes, mouth, eyebrows, nose, nostrils). Then the facial landmarks are tracked across frames to compare their shapes and relative locations to estimate the facial expression. Certain universal facial expressions, such as neutral, happy, angry, sad, surprise, and disgust, may be classified on the spatial-temporal relationships of the facial landmarks. The spatial-temporal relationships are modeled by HMMs.

In addition to the video sensors, at last another sensor may also be used to pick up non-visual information of the person to facilitate the analysis. For example, a microphone may be used to receive the voice signal of the person. A speech affect analysis module is used in the digital processing to extract voice cues relate to person's intention. Then all these features are integrated to assess the behavior, stress and intention of that person. The assessment can be modulated by cultural and linguistic models to optimize the accuracy of classification. A dynamic Bayesian network can be used to perform the feature integration over time.

Figure 30:
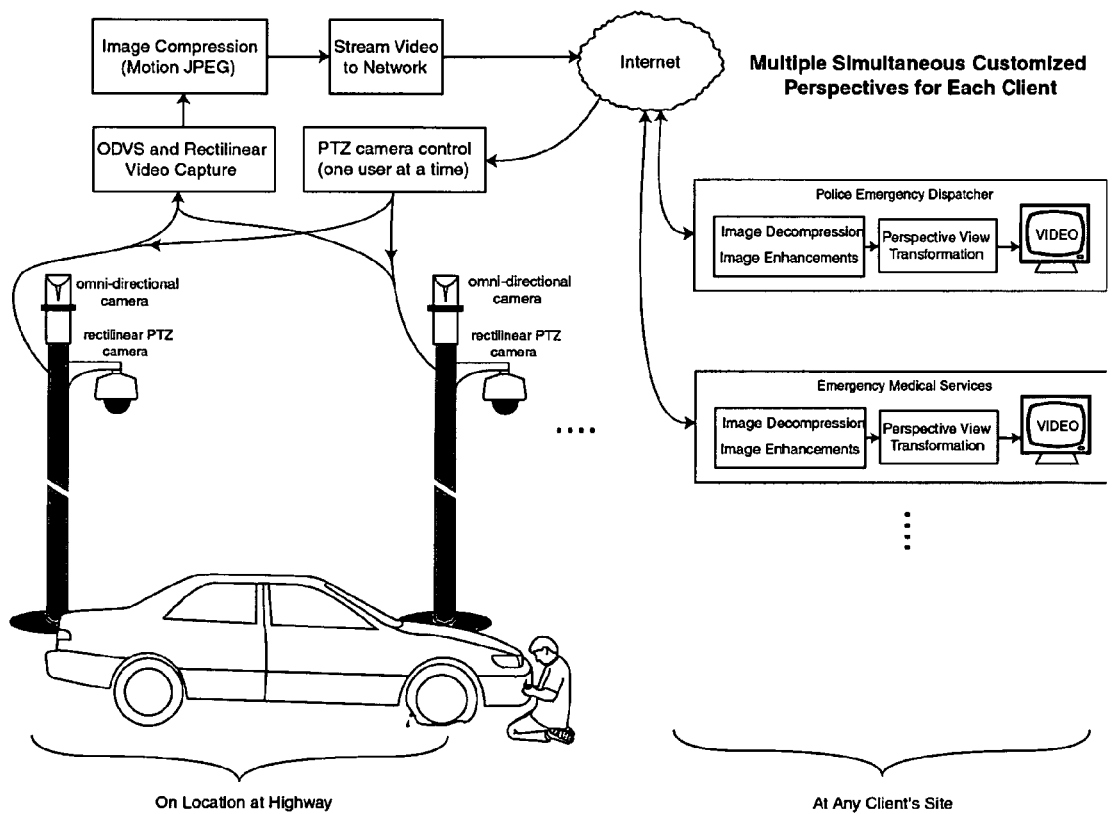
FIG. 30 shows one exemplary system where both high-resolution rectilinear video cameras and low-resolution omnidirectional video cameras are deployed in a target area to further expand the flexibility of customizable viewing of the target area by multiple clients.

As illustrated in FIG. 29, different video cameras may be combined in a system to fully explore different imaging capturing capabilities of different cameras. One example is a system shown in FIG. 30 where both high-resolution rectilinear video cameras and omnidirectional video cameras are deployed in a target area to further expand the flexibility of customizable viewing of the target area by multiple clients. As described above, the Digital Tele-Viewer (DTV) software allows multiple clients to view the same omnidirectional video stream simultaneously. Each client can customize the viewing direction without interfere others by specifying a pan-tilt-zoom setting. This feature is not possible on a rectilinear pan-tilt-zoom camera since it allows only one viewing direction at any time. However, the advantage of using rectilinear pan-tilt-zoom cameras is on higher image resolution. The illustrated architecture of the combination of omnidirectional cameras and rectilinear pan-tilt-zoom cameras may be used to allow each client to use the video images from one or more omnidirectional cameras to monitor the target area and to select more detailed images from a proper rectilinear camera to obtain information that may not be available from the unwarped lower-resolution perspective images of the omnidirectional cameras. It is also possible to seamlessly fuse high-resolution rectilinear image with the low-resolution DTV image. It is done by finding the registration points between two images and overlaying the aligned high-resolution rectilinear image to the DTV image.

The DTV module may also be made customizable on multiple types of cameras. For example, besides using ODVS based on regular color CCD sensor arrays, the omnicam may use thermo infrared (IR) sensor arrays. Such thermo IR DTV can work 24 hours for anything that generates heat, including humans and vehicles. In addition, near infrared monochromatic (e.g., black and white) cameras with infrared LED illumination may be useful for totally dark indoor environments and in-vehicle environments where illumination condition keeps changing. Also, visible-light BW cameras usually have higher image quality than color cameras. With these different types of cameras, a user can switch between them to attain digital televiewing on all kinds of environments with desirable accuracy for their applications.

The live DTV video can be digitally overlaid onto other digital images such as digital maps, CAD drawings, and aerial images. When the location of the camera is given or known, the video can be aligned to any one of these maps or an aligned combination of them. The overlaying can be done by registering the four corner of the live DTV video on the background map or image and warp the video to match the context of the map. The registration settings are retrieved every time the map is redrawn.

FIG. 31 shows one implementation for overlaying the live DTV video over a digital image. First, a proper camera is selected and the video form the selected camera is acquired and decompressed. Next, the display cycle synchronization is performed. Based on the registration settings between the live DTV video and the digital image, the live video is inserted into the digital image.

FIGS. 32A, 32B, and 32C illustrate examples of this feature. FIG. 32A shows a map that is an aligned combination of digital map with aerial image. In FIG. 3B, as the map is zoomed in, a live video superimposed on the map becomes visible. FIG. 3C shows the further zoomed-in map with overlaid local live video while in the background the digital map is taken away from the aerial image.

The overlapping between the live DTV video and the digital map creates a navigable map. Such a navigable map may serve as a navigation map on a PDA or other portable electronic device for the visitors. The PDA may be equipped with a GPS to locate its location and a electronic compass to detect its direction. The location is used to center the navigable map and the direction is used to orient the map for the user. Thus the navigable map on the PDA directs the visitor all the way to the destination. The same scenario can also be applied to car navigation system. The navigable map will be especially useful for first responders to locate a car accident, for example, and meanwhile observe the up-to-date situation from the live overlay DTV video. The map can be implemented on a work station or other static computer systems. The navigable map can also be implemented on wearable computers with a goggle/wrist watch display for the user.

Additional digital processing functions may be used to extract useful information from a live video signal. One processing function is motion detection based on optical-flow, frame difference with steerable filters, etc. Another processing function is background modeling to segment foreground objects with shadow suppression capability. Such motion detection and background modeling may be used for crowd size estimation to detect possible needs for dispatching police officers to control the crowd. The crowd is segmented by adaptive background subtraction with shadow suppression. If the crowd area is large enough for a period, an alarm may be triggered to alert the system for certain actions.

Figure 33:
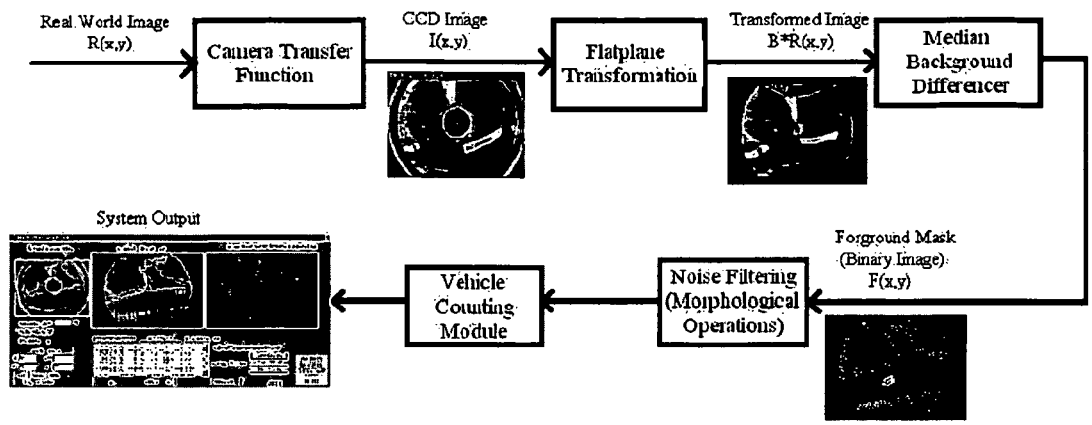
FIG. 33 shows a method for counting vehicles in a live video.

Yet another processing function is a flat-plane transformation used for unwrapping the omnidirectional video on all directions around the ODVS to a same plane under the ODVS so that a line looks straight on the flat-plane image. FIG. 33 shows a method for counting vehicles in a live video. After the flat-plane transformation, the background subtraction is performed and the vehicles in the flat-plane image can then be segmented. Grid zones may be defined on the flat-plane video to detect vehicles and accumulate the count over time.

Motion detection on omnidirectional video can be used to detect visual events. For example, an aircraft carrier moves in the video can be segmented by motion and tracked, and a blockage on the ship is generated according to the track to deny the access of lower level clients on a secure DTV server. For the image blockage, the omnidirectional video can be first converted to flat-plane video to detect the ship and track the ship on the flat-plane using Kalman filter. The track generates blockage parameters for the ship, which are the starting point and width of the blocking sector. Similarly cars and people can be segmented and tracked from the omnidirectional video. Virtual fencing can also be defined where alarms would be triggered if any object under tracking invades the predefined zones on the flat-plane video such as 500 yards around the pillars of Golden Gate bridge.

Figure 34:
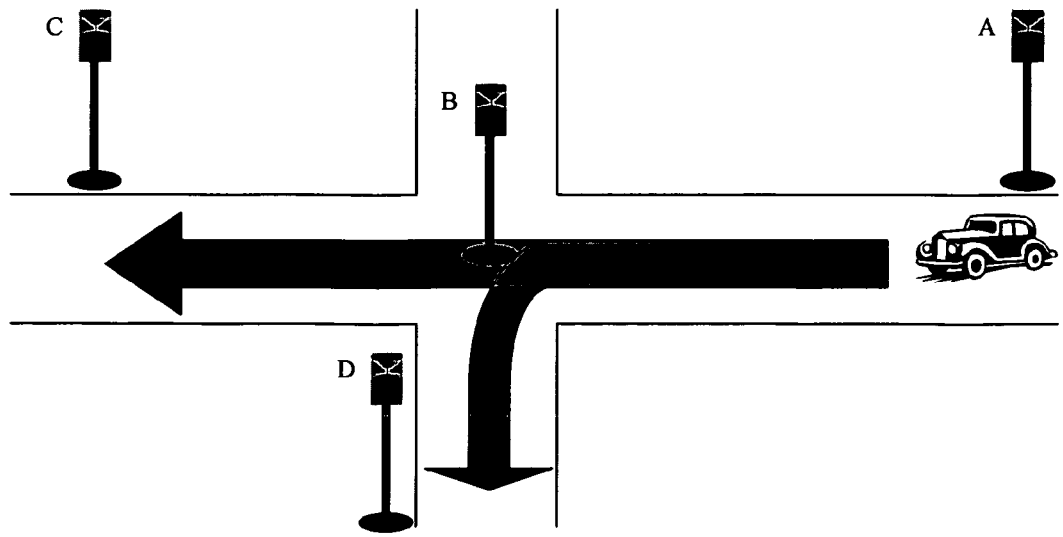
FIG. 34 shows cameras deployed over a wide area with little or no overlapping between the camera overages for monitoring traffic.

Tracking of objects may be implemented in an array of video cameras with non-overlapping coverage. FIG. 34 shows cameras deployed over a wide area with little or no overlapping between the camera overages for monitoring traffic. The vehicle can be detected and tracked by camera A using the techniques mentioned in the last paragraph. As the vehicle moves from camera A, camera B starts seeing the vehicle and thus begins tracking it. Knowing the track identity, velocity, and direction of the vehicle from camera A, camera B can determine that the newly detected vehicle is the same car tracked by camera A, and the track from camera A is inherited by camera B. If camera B tracks a left turn of the vehicle, then camera D inherits the track, otherwise camera C does. Henceforth the vehicles in the area can be tracked by the handover camera network.

Systems combining the above tracking on ODVS networks, head and face tracking, face detection, face recognition, facial affect, intent analysis, and view generation, as well as body part segmentation, modeling, and tracking surely have many applications for indoor, outdoor, and mobile environments. For indoor applications, person tracking, facial expression, gesture, and pose recognitions can be used in art gallery, teleconference, surveillance system, etc. For outdoor applications, those analysis algorithms can be used on public places, highways, airports, parking lots, etc. One example of outdoor application is tracking the vehicles on the road and detecting intruders at one spot. As vehicles and pedestrians are tracked, an ID number is assigned to each tack. As a track gets into the pre-defined restriction zone, a rectilinear PTZ camera zooms into the zone and identifies the license plate and detects the face with super-resolution enhancements. The face is analyzed to assess the intension of the driver and trigger an alarm if threatening event is recognized.

For mobile applications, the above systems and techniques may be used as an intelligent driver assistance system to monitor the driver and surround traffic. Driver attention and affect states can be estimated from the visual, audio, and thermo cues. The surround analysis detects lane, other vehicles, pedestrians, road signs, and obstacles. Then high-level modules integrate these cues in a spatial-temporal way to recognize the current state of safety and warn the driver accordingly and take emergency procedures. Also other mobile applications may include navigable map on wearable computers, airplane navigation and assistance system on taking-off and landing, ship surveillance, and motive robotic platforms.

Only a few implementations and examples are disclosed. However, it is understood that variations and enhancements may be made without departing from the spirit of and are intended to be encompassed by the following claims.

What is claimed is:

1. A system, comprising:
    an array of video cameras to capture warped panoramic video images of a scene and to produce a video stream; and
    a digital processor to receive and process said video stream, said digital processor comprising:
        a first processing module to unwarp said warped panoramic video images to produce rectilinear video images of the scene, wherein said first processing module provides at least one of pan, tilt, and zoom adjustments to allow for customized viewing of the scene in the produced rectilinear video images in a first perspective view,
        a second processing module to detect and track a person's head in the rectilinear video images and to extract video images in the tracked person's direction of view from the rectilinear video images so as to produce rectilinear video images in a second perspective view different from the first perspective view, and
        a third processing module to process images of a face from streaming video images for face recognition, wherein said third processing module performs a single-frame subspace feature analysis on multiple segments of the streaming video images to produce a sequence of classification results and a sequence of feature vectors, each classification result and feature vector corresponding to a length L segment of streaming video images, where L is an integer greater than 1, and then processes said sequences separately to produce video-based face recognition outputs;
    wherein the array of video cameras comprises an omni-direction video camera to capture the warped panoramic video images in a full 360-degree view, and
    where the customized viewing of the scene in the produced rectilinear video images comprises at least one view from the full 360-degree view.

2. The system as in claim 1, wherein said second processing module performs an edge detection in the rectilinear video images to extract features and an ellipse detection to extract possible head images.

3. The system as in claim 1, wherein said second processing module performs Kalman filtering to predict an orientation of and track motion of the person's head.

4. The system as in claim 1, further comprising a mechanism to produce a warning signal according to the orientation of the person's head.

5. The system as in claim 1, wherein said third processing module is configured to apply a majority decision rule in processing the sequence of classification results.

6. The system as in claim 1, wherein said third processing module is configured to apply a discrete hidden Markov model decision rule in processing the sequence of classification results.

7. The system as in claim 1, wherein said third processing module is configured to apply a continuous density hidden Markov model decision rule in processing the sequence of feature vectors.

8. The system as in claim 1, further comprising a mechanism to measure a facial temperature pattern of a person.

9. The system as in claim 1, further comprising a mechanism for performing a facial affect analysis on a person.

10. The system as in claim 1, further comprising a mechanism for performing a speech affect analysis.

11. The system as in claim 1, further comprising a plurality of video cameras to capture warped panoramic video images of the same scene from different locations, wherein said digital processor processes signals from said array of video cameras and said one video camera to detect and tract movement of an object in the scene.

12. The system as in claim 11, wherein said digital processor performs shadow detection from each video signal from each video camera to segment the object from the scene.

13. The system as in claim 12, wherein said digital processor performs a triangulation according to positions of the video cameras to produce horizontal positions x, y of the object and a height estimation algorithm to produce averaged vertical position z of the object.

14. The system as in claim 13, wherein said digital processor registers a track of movement for the object according to x and y positions.

15. The system as in claim 13, wherein the triangulation is performed by using an extended N-ocular algorithm.

16. A system, comprising:
    an array of video cameras to capture warped panoramic video images of a scene and to produce a video stream;
    a video transmission mechanism to deliver said video stream to a plurality of video receivers, said video transmission mechanism comprising a video server which filters information in said video stream according to security levels assigned to video receivers to produce different filtered video streams to different video receivers; and
    a digital processor in each video receiver to independently process said video stream to unwarp said warped panoramic video images to produce rectilinear video images of the scene, said digital processor at each video receiving having a user graphic interface with at least one of pan, tilt, and zoom adjustments to allow for customized viewing at each video receiver that are independent from each another and represent different perspective views,
    wherein the digital processor further processes images of a face from said video stream for face recognition, by performing a single-frame subspace feature analysis on multiple segments of the video stream images to produce a sequence of classification results and a sequence of feature vectors, each classification result and feature vector corresponding to a length L segment of streaming video images, where L is an integer greater than 1, and then processes said sequences separately to produce video-based face recognition outputs;
    wherein the array of video cameras comprises an omni-direction video camera to capture the warped panoramic video images in a full 360-degree view, and
    where the customized viewing of the scene in the produced rectilinear video images comprises at least one view from the full 360-degree view.

17. The system as in claim 16, wherein said video servo includes a digital process to tracks a change in the scene and adjusts filtering in a filtered video stream according to the change in the scene.

18. The system as in claim 16, wherein one video receiver includes a PDA.

19. The system as in claim 16, wherein one video receiver includes a laptop computer.

20. The system as in claim 16, wherein one video receiver includes a desktop computer.

21. The system as in claim 16, where said video camera is an omni-directional video camera to capture a 360-degree view of the scene.

22. The system as in claim 16, wherein said digital processor includes a module that detects and tracks a person's head.

23. The system as in claim 22, wherein said module further detects a face orientation of the person.

24. The system as in claim 23, wherein said module further extracts a video image in the person's view from the video according to estimated face orientation.

25. The system as in claim 16, wherein said digital processor includes a tracking module to detect and track a location of an object or a person in real time.

26. The system as in claim 16, wherein said video transmission mechanism includes a wired communication link.

27. The system as in claim 16, wherein said video transmission mechanism includes a wireless communication link.

28. The system as in claim 16, wherein said video transmission mechanism includes a video server that removes selected image information from a video signal to send a modified video signal to a video receiver.

29. A system, comprising:
an array of video cameras to capture warped panoramic video images of a scene and to produce a video stream; and
a digital processor to receive and process said video stream, said digital processor comprising:
a first processing module to unwarp said warped panoramic video images to produce rectilinear video images of the scene, wherein said first processing module provides at least one of pan, tilt, and zoom adjustments to allow for customized viewing of the scene in a first perspective view, and
a second processing module to extract a face from the streaming rectilinear video images, to perform face recognition on the extracted face, and to generate images viewed by the recognized face in a second perspective view independent of the first perspective view based on estimating an orientation of the face in the rectilinear video images, and
a third processing module to perform face recognition by performing a single-frame subspace feature analysis on multiple segments of the streaming rectilinear video images to produce a sequence of classification results and a sequence of feature vectors, each classification result and feature vector corresponding to a length L segment of streaming video images, where L is an integer greater than 1, and then processes said sequences separately to produce face recognition outputs;
wherein the array of video cameras comprises an omni-direction video camera to capture the warped panoramic video images in a full 360-degree view, and
where the customized viewing of the scene in the produced rectilinear video images comprises at least one view from the full 360-degree view.

30. A system, comprising:
an array of video cameras to capture warped panoramic video images of a scene and to produce a video stream;
a video transmission mechanism to deliver said video stream to a first video receiver and a second video receiver
a digital processor in said first video receiver to process said video stream to unwarp said warped panoramic video images to produce rectilinear video images of the scene,
wherein said digital processor in said first video receiver includes a user graphic interface with at least one of pan, tilt, and zoom adjustments to allow for customized viewing of the scene in a first perspective view, and said digital processor is operable to superimpose a customized video of the scene over a digital image; and
another digital processor in said second video receiver to process said video stream to unwarp said warped panoramic video images to produce rectilinear video images of the scene, wherein the other digital processor in said second video receiver includes another user graphic interface with at least one of pan, tilt, and zoom adjustments to allow for customized viewing of the scene in a second perspective view independent of the digital processor in the first video receiver so that the second perspective view is capable of being different from the first perspective view,
wherein the digital processor further processes images of a face from said video stream for face recognition, by performing a single-frame subspace feature analysis on multiple segments of video stream images to produce a sequence of classification results and a sequence of feature vectors, each classification result and feature vector corresponding to a length L segment of streaming video images, where L is an integer greater than 1, and then processes said sequences separately to produce video-based face recognition outputs,
wherein the array of video cameras comprises an omni-direction video camera to capture the warped panoramic video images in a full 360-degree view, and
where the customized viewing of the scene in the produced rectilinear video images comprises at least one view from the full 360-degree view.

31. The system as in claim 30, wherein said digital image is a map of an area including the scene.

* * * * *